(12) United States Patent
Garlow et al.

(10) Patent No.: US 7,786,691 B2
(45) Date of Patent: Aug. 31, 2010

(54) BUS DISTURBANCE REGULATOR

(75) Inventors: Mark E. Garlow, Kenosha, WI (US); William S. Hammel, Franksville, WI (US)

(73) Assignee: Unico, Inc., Franksville, WI (US)

( * ) Notice: Subject to any disclaimer, the term of this patent is extended or adjusted under 35 U.S.C. 154(b) by 464 days.

(21) Appl. No.: 11/872,134

(22) Filed: Oct. 15, 2007

(65) Prior Publication Data
US 2008/0094020 A1  Apr. 24, 2008

Related U.S. Application Data

(63) Continuation-in-part of application No. 11/552,333, filed on Oct. 24, 2006, now Pat. No. 7,545,113.

(51) Int. Cl.
  *H02M 1/12* (2006.01)
(52) U.S. Cl. .................. 318/629; 318/609; 318/611; 318/632
(58) Field of Classification Search .......... 318/565, 318/568.19, 568.22, 600, 609–611, 621, 318/623, 629, 632
See application file for complete search history.

(56) References Cited

U.S. PATENT DOCUMENTS

| | | | |
|---|---|---|---|
| 3,628,123 A | 12/1971 | Rosa et al. | |
| 4,876,634 A | 10/1989 | Paice | |
| 5,124,904 A | 6/1992 | Paice | |
| 5,148,357 A | 9/1992 | Paice | |
| 5,235,503 A | 8/1993 | Stemmler et al. | |
| 5,280,421 A * | 1/1994 | De Doncker et al. | 363/98 |
| 5,384,696 A * | 1/1995 | Moran et al. | 363/40 |
| 5,446,642 A | 8/1995 | McMurray | |
| 5,455,759 A | 10/1995 | Paice | |

(Continued)

FOREIGN PATENT DOCUMENTS

JP  05-336663 A  12/1993

(Continued)

OTHER PUBLICATIONS

Jaganath Chandrasekar, Li Liu, Dan Patt, Peretz P. Friedmann, and Dennis S. Bernstein; "Adaptive Harmonic Steady-State Control for Disturbance Rejection"; Paper; Nov. 2006; pp. 993 -1007; vol. 14, No. 6, IEEE Transactions on Control Systems Technology.

(Continued)

*Primary Examiner*—Bentsu Ro
(74) *Attorney, Agent, or Firm*—Reinhart Boerner Van Deuren P.C.

(57) ABSTRACT

Presented is a harmonic regulator that regulates a plurality of individual harmonics in a system having periodic torque disturbances to commanded values, including zero. For each harmonic being regulated, a feedback signal having at least one harmonic component due to the harmonic being regulated is transformed from a source reference frame to a harmonic reference frame of the harmonic being regulated to form a qd feedback signal. The qd feedback signal is subtracted from the commanded value to form a qd signal and regulated. The regulated qd signal is transformed to a destination reference frame to form a compensation signal and the compensation signal is added to a control signal to form a qd control signal that drives each harmonic being regulated towards the commanded value.

14 Claims, 36 Drawing Sheets

U.S. PATENT DOCUMENTS

| | | | |
|---|---|---|---|
| 5,465,203 | A | 11/1995 | Bhattacharya et al. |
| 5,513,090 | A | 4/1996 | Bhattacharya et al. |
| 5,568,371 | A | 10/1996 | Pitel et al. |
| 5,585,709 | A | 12/1996 | Jansen et al. |
| 5,619,407 | A | 4/1997 | Hammond |
| 5,731,965 | A | 3/1998 | Cheng et al. |
| 5,781,428 | A | 7/1998 | Paice |
| 5,793,167 | A * | 8/1998 | Liang et al. ............ 318/141 |
| 6,028,405 | A | 2/2000 | Kume et al. |
| 6,087,738 | A | 7/2000 | Hammond |
| 6,101,113 | A | 8/2000 | Paice |
| 6,191,968 | B1 | 2/2001 | Paice |
| 6,198,647 | B1 | 3/2001 | Zhou et al. |
| 6,249,443 | B1 | 6/2001 | Zhou et al. |
| 6,295,216 | B1 | 9/2001 | Faria et al. |
| 6,335,872 | B1 | 1/2002 | Zhou et al. |
| 6,385,064 | B1 | 5/2002 | Zhou et al. |
| 6,472,775 | B1 | 10/2002 | Huang et al. |
| 6,498,736 | B1 | 12/2002 | Kamath |
| 6,525,951 | B1 | 2/2003 | Paice |
| 6,650,557 | B2 | 11/2003 | Ferens et al. |
| 6,674,262 | B2 | 1/2004 | Kitajima et al. |
| 6,727,675 | B2 | 4/2004 | Yoshimoto et al. |
| 6,777,907 | B2 * | 8/2004 | Ho ............................ 318/801 |
| 6,861,936 | B2 | 3/2005 | Kamath |
| 6,894,454 | B2 | 5/2005 | Patel et al. |
| 6,950,322 | B2 | 9/2005 | Ferens |
| 6,977,827 | B2 * | 12/2005 | Gritter ......................... 363/40 |
| 6,982,884 | B1 | 1/2006 | Paice |
| 6,995,993 | B2 | 2/2006 | Sarlioglu et al. |
| 7,005,840 | B2 | 2/2006 | Cester |
| 7,049,921 | B2 | 5/2006 | Owen |
| 2006/0038531 | A1 | 2/2006 | Wakabayashi et al. |
| 2006/0056207 | A1 | 3/2006 | Sarlioglu |

FOREIGN PATENT DOCUMENTS

| | | |
|---|---|---|
| JP | 02926931 B2 | 7/1999 |
| KR | 10-2000-0020961 A | 4/2000 |

OTHER PUBLICATIONS

P. Verdelho and G. D. Marques; An Active Power Filter and Unbalanced Current Compensator; Paper; Jun. 1997; pp. 321-328; vol. 44, No. 3, IEEE Transactions on Industrial Electronics.

Seung-Gi Jeong and Myung-Ho Woo; "DSP-Based Active Power Filter with Predictive Current Control"; Paper; Jun. 1997; pp. 329-336; vol. 44, No. 3, IEEE Transactions on Industrial Electronics.

Pichai Jintakosonwit, Hirofumi Akagi; Hideaki Fujita and Satoshi Ogasawara; "Implementation and Performance of Automatic Gain Adjustment in a Shunt Active Filter for Harmonic Damping Throughout a Power Distribution System"; Paper; May 2002; pp. 438-447; vol. 17, No. 3, IEEE Transactions on Power Electronics.

Subhashish Bhattacharya, Deepak M. Divan, and B. Ben Banerjee; "Control and Reduction of Terminal Voltage Total Harmonic Distortion (THD) in a Hybrid Series Active and Parallel Passive Filter System"; Paper; Sep. 1993; pp. 779-786; IEEE.

Keliang Zhou and Danwei Wang; "Digital Repetitive Learning Controller for Three-Phase CVCF PWM Inverter"; Paper; Aug. 2001; pp. 820-830; vol. 48, No. 4, IEEE Transactions on Industrial Electronics.

Patrick L. Chapman and Scott D. Sudhoff; "Design and Precise Realization of Optimized Current Waveforms for an 8/6 Switched Reluctance Drive"; Paper; Jan. 2002; pp. 76-83; vol. 17, No. 1, IEEE Transactions on Power Electronics.

Tinghsu Su, Satomi Hattori, Muneaki Ishida and Takamasa Hori; "Suppression Control Method for Torque Vibration of AC Motor Utilizing Repetitive Controller With Fourier Transform"; Paper; Sep./Oct. 2002; pp. 1316-1325; vol. 38, No. 5, IEEE Transactions on Industry Applications.

Po-Tai Cheng, Subhashish Bhattacharya and Deepak Divan; "Experimental Verification of Dominant Harmonic Active Filter for High-Power Applications"; Paper; Mar./Apr. 2000; pp. 567-577; vol. 36, No. 2, IEEE Transactions on Industry Applications, Mar. 15, 2010.

Ion Etxeberria-Oradui, Amaia López, Haizea Gaztañaga, Seddik Bacha and M. Raúl Reyero; "A Single Synchronous Frame Hybrid (SSFH) Multifrequency Controller for Power Active Filters"; Paper; Oct. 2006; pp. 1640-1648; vol. 53, No. 5, IEEE Transactions on Industrial Electronics.

Lazhar Ben-Brahim; "Letters to the Editor—On the Compensation of Dead Time and Zero-Current Crossing for a PWM-Inverter-Controlled AC Servo Drive"; Paper; Oct. 2004; pp. 1113-1117; vol. 51, No. 5, IEEE Transactions of Industrial Electronics.

Gary L. Sinbsinski et al., Cost Effective Multi-Pulse Transformer Solutions for Harmonic Mitigation in AC Drives, paper, 2003, 10 pages.

* cited by examiner

FIG. 25a    Current
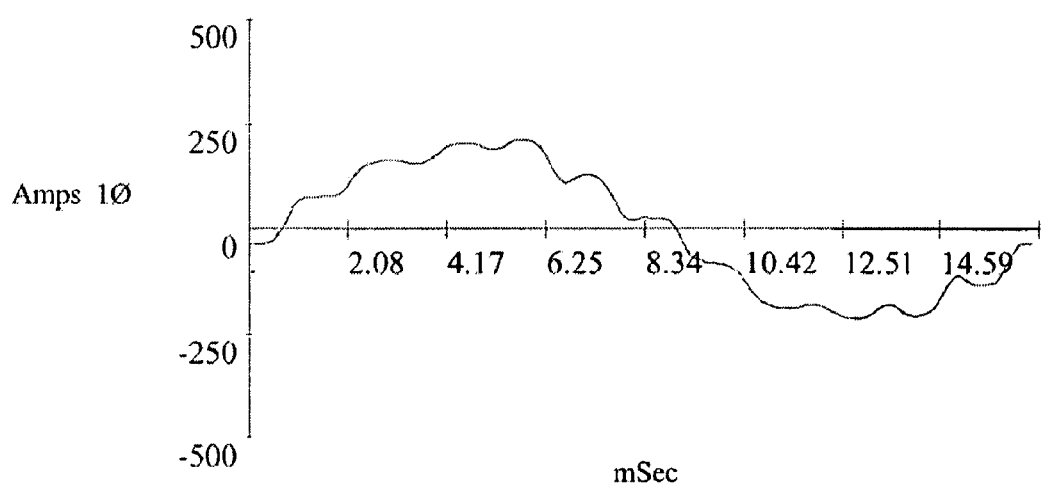
FIG. 25b    Current
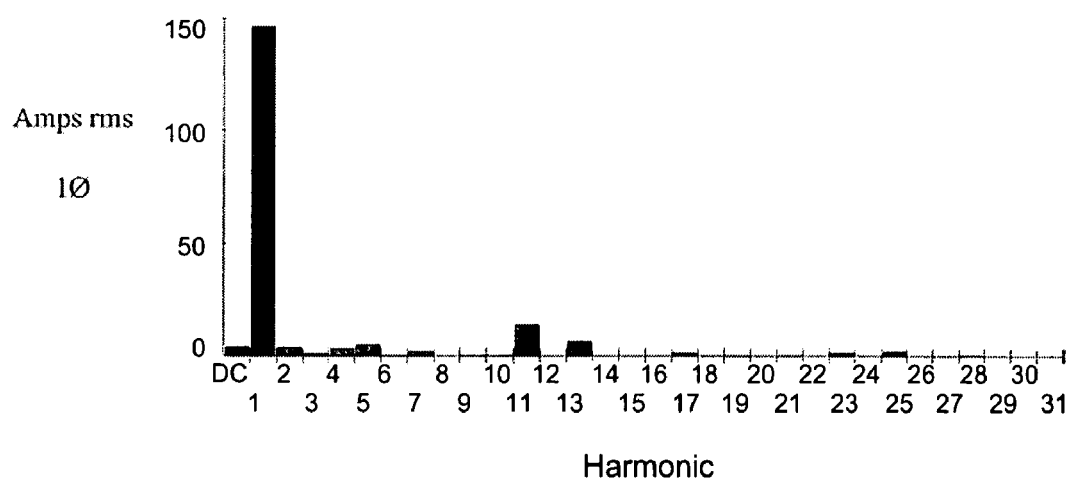

FIG. 26a  Current
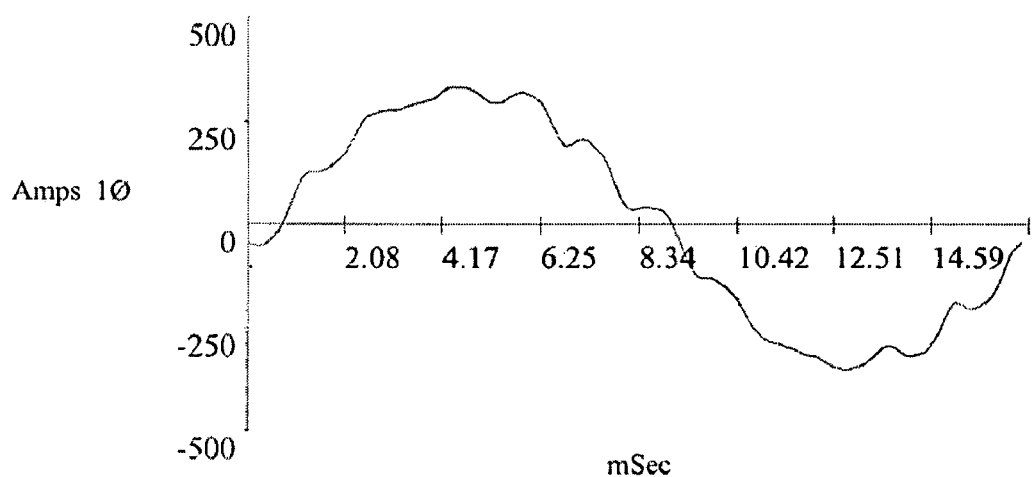
FIG. 26b  Current
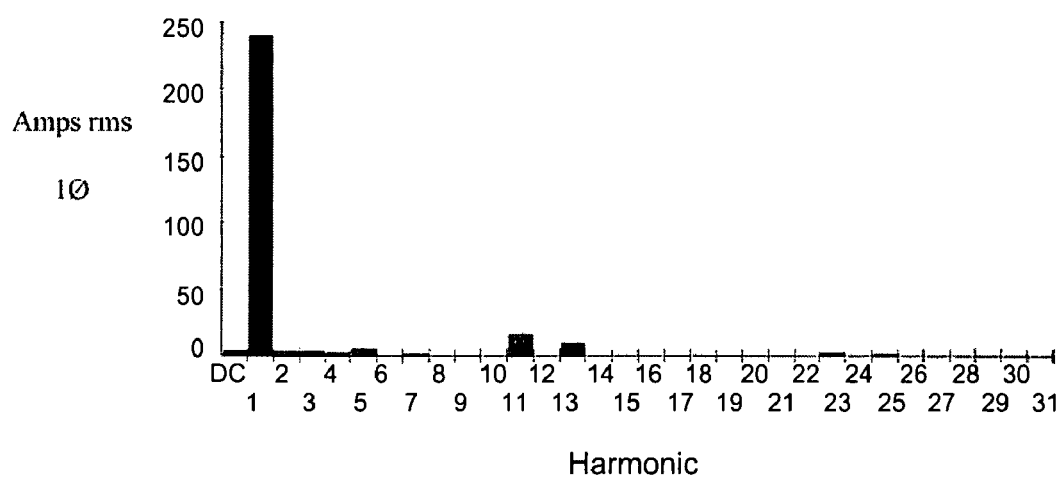

BUS DISTURBANCE REGULATOR

CROSS-REFERENCE TO RELATED PATENT APPLICATIONS

This patent application is a continuation-in-part of co-pending U.S. patent application Ser. No. 11/552,333, filed on Oct. 24, 2006, the entire disclosure of which is hereby incorporated by reference.

BACKGROUND

There are many fields where operating a motor at a desired speed with little or no speed variation due to torque disturbance is required. For example, engine characterization requires operation at a selected speed. In a cold engine test system, an electronic motor drive is used to rotate an engine under test at a desired speed for purposes of, for example, engine design optimization, engine cylinder leakage characterization, etc. However, the engine under test exerts undesirable periodic torque disturbances on the motor shaft due to the engine cylinder compression/cam linkage interaction. The periodic torque disturbances are harmonically related to the rotational speed of the engine cam shaft and crank shaft and cause the actual engine speed to vary, which is not desirable for the characterization being done. Other areas that may produce periodic mechanical torque disturbances include rolling mills, rotary and reciprocal pumps, coilers and uncoilers, etc. Periodic torque disturbances may also occur due to the electrical distortion caused in power electronic driven motor drives resulting from, for example, the dead time between phase leg switching events.

Several techniques have been developed to reduce the effects of periodic torque disturbance. Raising the bandwidth of the drive speed loop can lower the resulting engine speed variation, but does not remove it entirely. Another technique adds a disturbance torque observer to the speed loop to decouple and minimize the speed variation. However, error of the acceleration estimate term of the observer often leads to non-ideal decoupling and speed variation.

Another technique is referred to in literature as a repetitive controller. This technique has several drawbacks. One drawback is that it does not learn or compensate for the phase of each harmonic of interest. The repetitive controller has infinite gain (i.e., integral action) at every multiple of the harmonic of interest and "learns" the magnitude. The same amplitude of correction is applied to the harmonic of interest and each of its multiples. In an actual system, each multiple of a harmonic may require a different amplitude for its compensation. In order for the repetitive controller to work properly, the compensation for harmonic multiples not of interest must be removed. One method is by performing a Fast Fourier Transform (FFT), removing the bins containing the multiples not of interest and performing an inverse FFT, which is a cumbersome process. Additionally, the repetitive controller in many instances becomes unstable, which results in online learning of harmonics being precluded.

Another application for harmonic regulation is one where the harmonic torque disturbance is deliberately introduced to the system. Such applications include, for example, test stands where the electric motor must simulate the torque pulsations inherent in an internal combustion engine for the purpose of testing transmissions, alternators, air conditioners, pumps and other equipment. The usual method has been to use a torque profile which is mapped to the position of the simulated engine crank. This method has the disadvantage of not having good control at higher frequencies as a result of the limited bandwidth of the basic control algorithm.

BRIEF SUMMARY

Described herein is, among other things, a harmonic disturbance regulator, which was conceived to minimize and/or eliminate the mentioned problems.

The harmonic regulator regulates to commanded values, including zero, a plurality of individual harmonics in a system having and/or requiring periodic disturbances. For each harmonic being regulated, a feedback signal representing the harmonic being regulated is transformed from a source reference frame to a harmonic reference frame of the harmonic being regulated to form a qd feedback signal. The qd feedback signal is subtracted from the commanded value for the harmonic to form a qd error signal and is regulated. The regulated qd signal is transformed to a destination reference frame to form a compensation signal and the compensation signal is added to a control signal to form a qd control signal that drives each harmonic being regulated towards its commanded value.

The angle used to transform the feedback signal to the harmonic reference frame is derived by multiplying the phase of the feedback signal in the source frame by the harmonic number of the harmonic being regulated and setting the harmonic angle to the modulo $2\pi$ value of the resulting value. Similarly, the angle used to transform the regulated signal to the destination reference frame is derived from the modulo $2\pi$ of the phase of the feedback signal multiplied by the harmonic number subtracted by a difference value equal to destination harmonic number minus the source harmonic number.

In one embodiment, the system has an engine that is rotated over a speed range and when the engine speed goes below a predetermined value, the PI regulator used to regulate the qd signal is latched by zeroing the error signal, thereby keeping and the q and d values of the qd signal at the values that they were at prior to the engine speed going below the predetermined value Additional features and advantages will be made apparent from the following detailed description of illustrative embodiments, which proceeds with reference to the accompanying figures.

BRIEF DESCRIPTION OF THE DRAWINGS

The accompanying drawings incorporated in and forming a part of the specification illustrate several aspects of the harmonic regulator described herein, and together with the description serve to explain the principles of the harmonic regulator. In the drawings:

FIGS. 25a and 25b illustrate input current and input current harmonics data taken with an autotransformer connected to 250 Hp motor drives at an input current of approximately 150 amperes RMS;

FIGS. 26a and 26b illustrate input current and input current harmonics data of one of the drives taken with an autotransformer connected to 250 Hp motor drives at an input current of approximately 250 amperes RMS.

While the harmonic regulator will be described in connection with certain embodiments, there is no intent to limit it to those embodiments. On the contrary, the intent is to cover all alternatives, modifications and equivalents as included within the spirit and scope of the harmonic regulator as defined by the appended claims.

DETAILED DESCRIPTION

Figure 1:
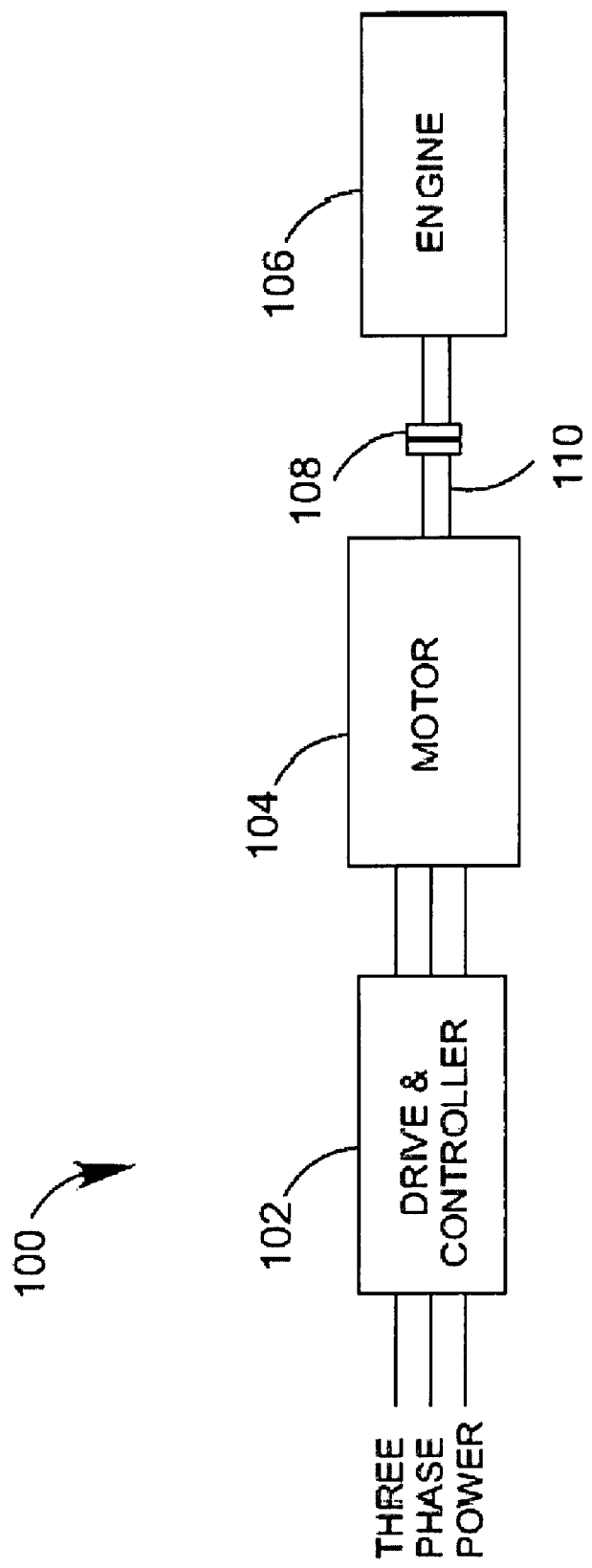
FIG. 1 is a block diagram of an exemplary operating environment in which the harmonic regulator may operate.

The harmonic regulator described herein regulates or eliminates harmonics that cause periodic torque disturbances. Referring initially to FIG. 1, an exemplary system 100 in which the present technology may operate is shown. The system includes a drive/controller 102 that receives three phase power at its input, converts it to a dc link, and controls motor 104 via power electronic switches (not shown). The motor 104 drives engine 106 through coupling 108. As previously described, the engine exerts a periodic torque disturbance on the motor shaft 110 due to cylinder compression/cam linkage interaction during rotation of the engine 106.

Figure 2:
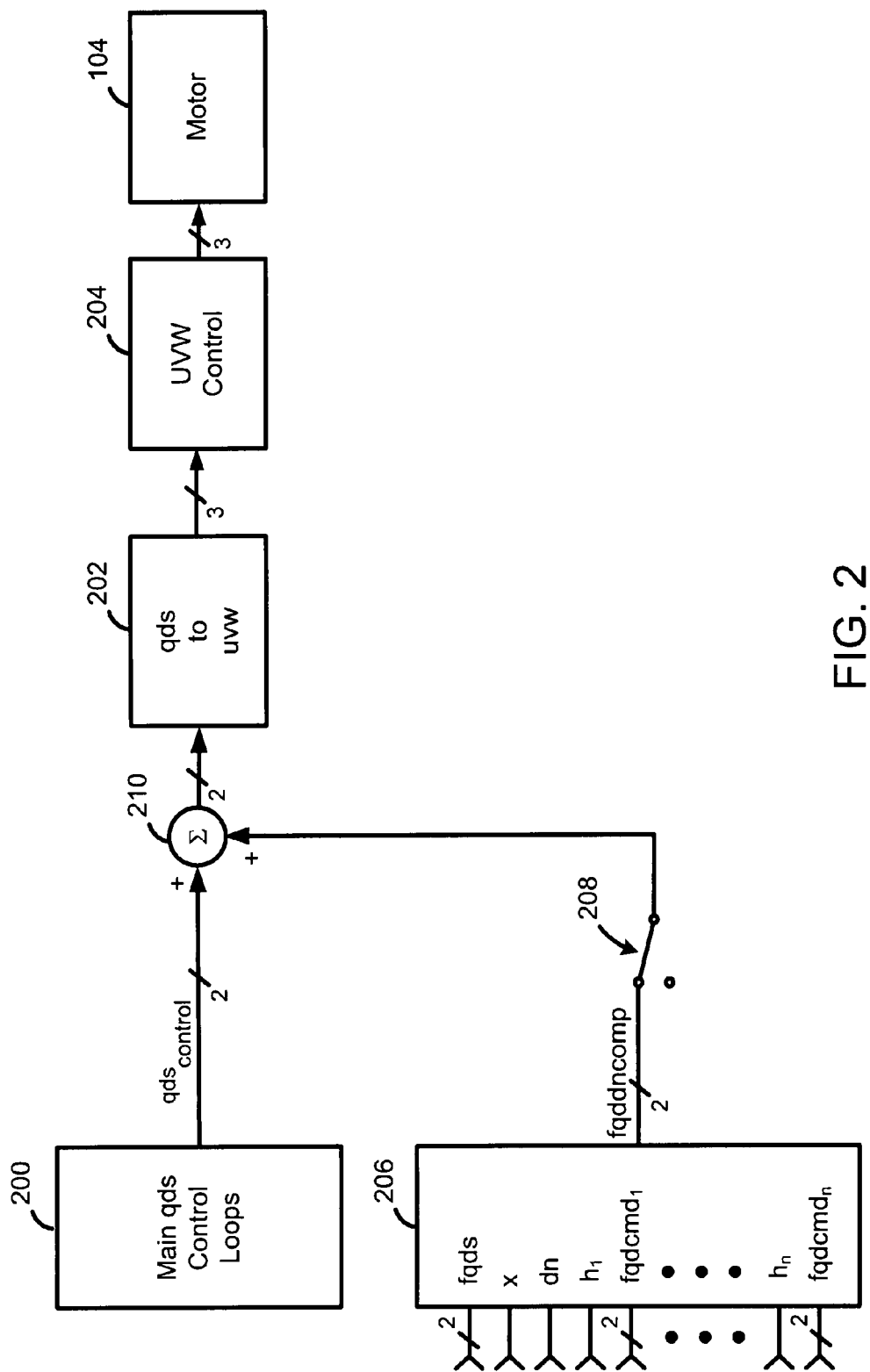
FIG. 2 is a block diagram view of an exemplary controller in which the harmonic regulator may be incorporated.

The drive/controller 102 can be of any form. The drive/controller 102 typically includes some form of computer readable media. Computer readable media can be any available media that can be accessed by the drive/controller 102 and can include both volatile and nonvolatile media, removable and non-removable media. For the description that follows, the drive/controller 102 shall be in the form of a qd type of controller where the main control loops are used in the qd reference frame, also known as the dq reference frame. Turning now to FIG. 2, the main control loop block 200 receives inputs such as commanded speed, motor speed, motor acceleration, etc. and outputs a qds control signal, where the qds control signal contains a quadrature axis control signal and a direct axis control signal. The qds control signal is transformed into an uvw control signal by qds to uvw block 202. The uvw control signal contains a control signals for each phase in the motor, which typically has three phases 120 degrees apart with respect to each other. The uvw control signal is used by uvw control block 204 to drive motor 104. Generally, the uvw control block 204 consists of an inverter that supplies power to each motor phase via pulse-width modulation (PWM) and/or the like.

Figure 3:
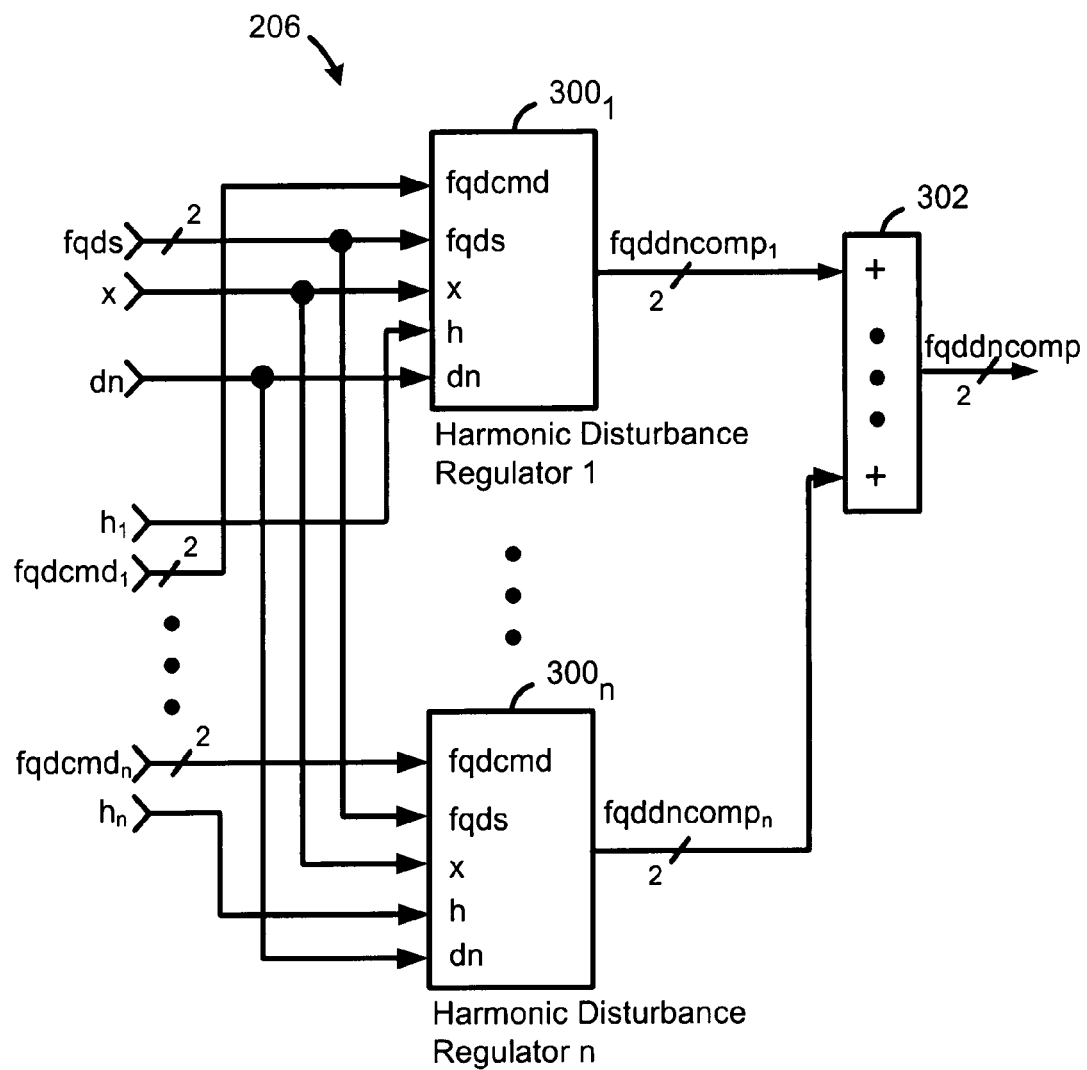
FIG. 3 is a block diagram of the harmonic regulator in which a plurality of individual harmonic regulators reside.

The harmonic regulator 206 regulates one or more selected harmonics to specified values, which can be zero, by outputting a control signal that is added to the qds control signal when switch 208 is activated. While switch 208 is shown, in one embodiment the harmonic regulator 206 is directly connected to summer 210. The harmonic regulator 206 contains a plurality of individual harmonic regulators 300n (see FIG. 3). The harmonic regulator 206 has an fqds input, an x input, and a dn input that are common to the plurality of individual harmonic regulators. The fqds input receives the vector feedback variable that is used in the main control loop and that has harmonic components due to the periodic torque disturbance. For example, in an application that controls mechanical torque disturbances (e.g., periodic torque disturbances), the fqds input could be motor acceleration, having, in the source frame, q axis magnitude only, or in an application for electrical voltage disturbance rejection (e.g., removing frequency dependent current harmonics due to inverter deadtime distortion), current feedback, potentially having both q and d axis magnitudes in the stationary reference frame. The x input is the angular position estimate of the fqds input upon which the harmonics are based and it sets the fundamental reference frame for the harmonics. The dn input is used as a "destination minus source" harmonic difference number for the output. For example a dn set to 1 when the source is the stationary frame sets the output to be in the first harmonic reference frame (i.e., synchronous fundamental reference frame) while a dn set to 0 sets the output to be in the stationary reference frame. The remaining multiple harmonic regulator inputs $h_1$ through $h_n$ and $fqdcmd_1$ through $fqdcmd_n$ are the harmonic numbers being regulated and the qd vector magnitude to which the harmonics are being controlled, respectively. A value of zero for the magnitude of these vectors causes the controller to regulate the associated harmonics to zero. The harmonics $h_1$ through $h_n$ to be regulated may be determined by an understanding of the nature of the system being controlled or by analyzing the disturbance using a Fast Fourier Transform or by other experimental methods. The outputs of each of the individual harmonic regulators are summed at summing block 302 (FIG. 3) and the summed output, fqddncomp, is summed with the qds control signal at summer 210. In the case where the fqds signal has only q axis magnitude, only the q axis component of the output is summed and the d axis component is held to zero.

Figure 4:
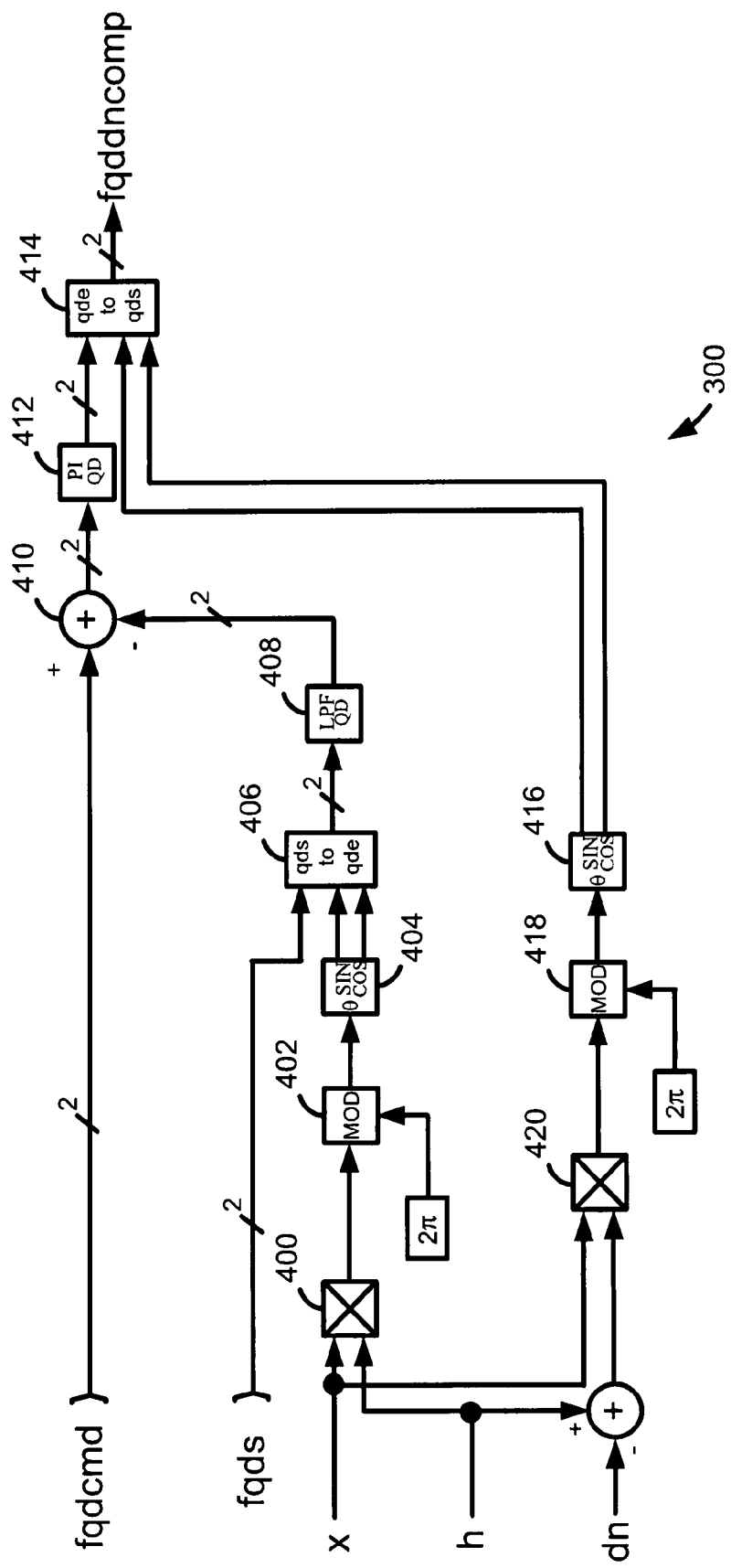
FIG. 4 is a block diagram of an individual harmonic regulator in accordance with the teachings herein.
Figure 5:
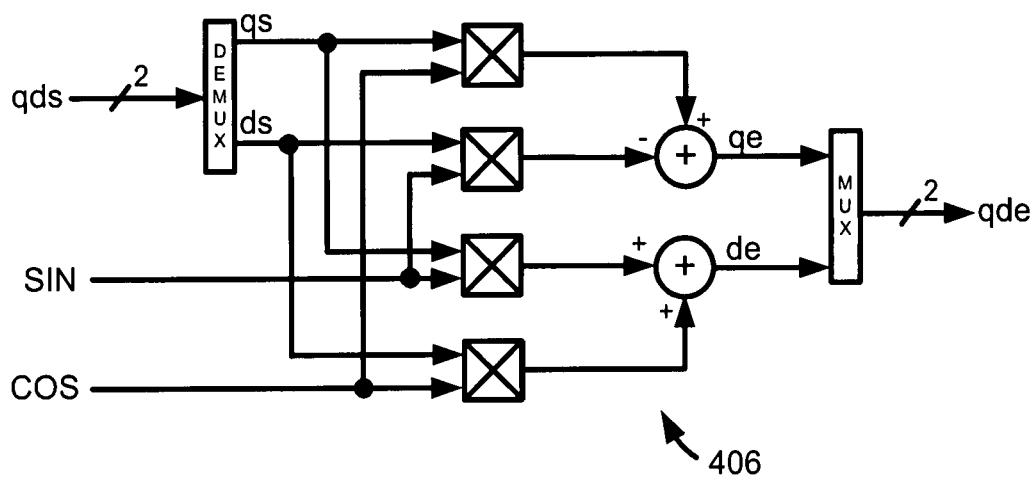
FIG. 5 is a block diagram of an embodiment of the source to harmonic frame transformation block of FIG. 4.
Figure 6:
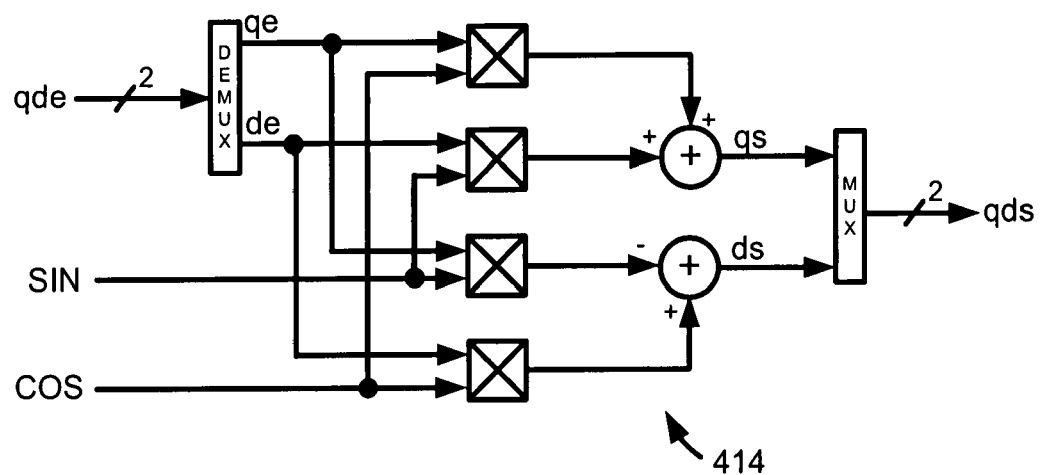
FIG. 6 is a block diagram of an embodiment of the harmonic to selected destination frame transformation block of FIG. 4.
Figure 7:
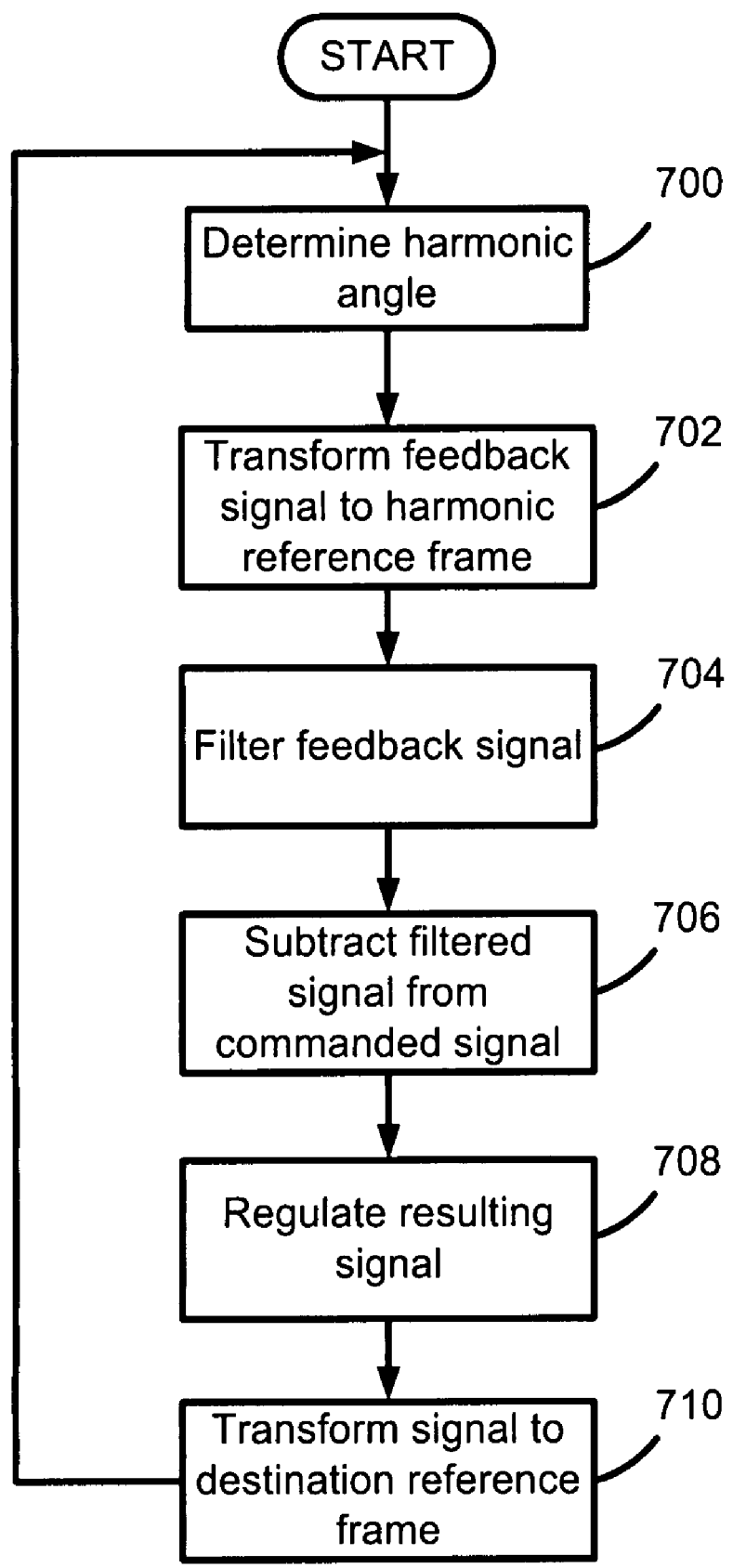
FIG. 7 is a flowchart illustrating the steps performed to regulate one or more harmonics.

Turning now to FIG. 4 in conjunction with FIG. 7, an embodiment of the harmonic regulator 300 is illustrated. At blocks 400 to 402, the x input and harmonic number h being regulated are multiplied (block 400) and the modulo 2π is derived (block 402) to obtain the angle θ (theta) at which the harmonic being regulated is with respect to the stationary reference frame (step 700). The angle θ is used to derive the sine and cosine functions (block 404) used in the source to harmonic frame transformation block 406 (see FIG. 5) to transform the fqds vector feedback variables into the harmonic frame of harmonic number h (step 702). For example, if the fifth harmonic is being regulated in a harmonic regulator 300, the fqds feedback variable would be transformed into the harmonic frame of the fifth harmonic. The resulting qdh variables are low pass filtered via filter block 408 to reduce or eliminate other frequencies present in the qdh variables so that the harmonic regulator 300 primarily regulates the harmonic of interest (step 704). Alternatively, bandpass filters could be implemented in the source reference frame prior to transformation to the harmonic reference frame. The resulting filtered qdh values are subtracted from the commanded qd values at summer 410 (step 706). The resulting error is regulated with a qd PI regulator (block 412) (step 708) and transformed (block 414—see FIG. 6) to the reference frame selected via the dn input (step 710). The sine and cosine functions used in block 414 are derived from block 416, which has an input angle derived from the modulo 2, (block 418) of the x input multiplied (at block 420) by the harmonic number minus the dn input value. The fqddncomp value for the selected harmonic is summed with other values, if any, at summing block 302 (FIG. 3), resulting in the fqddncomp output value of harmonic regulator 206.

Figure 8:
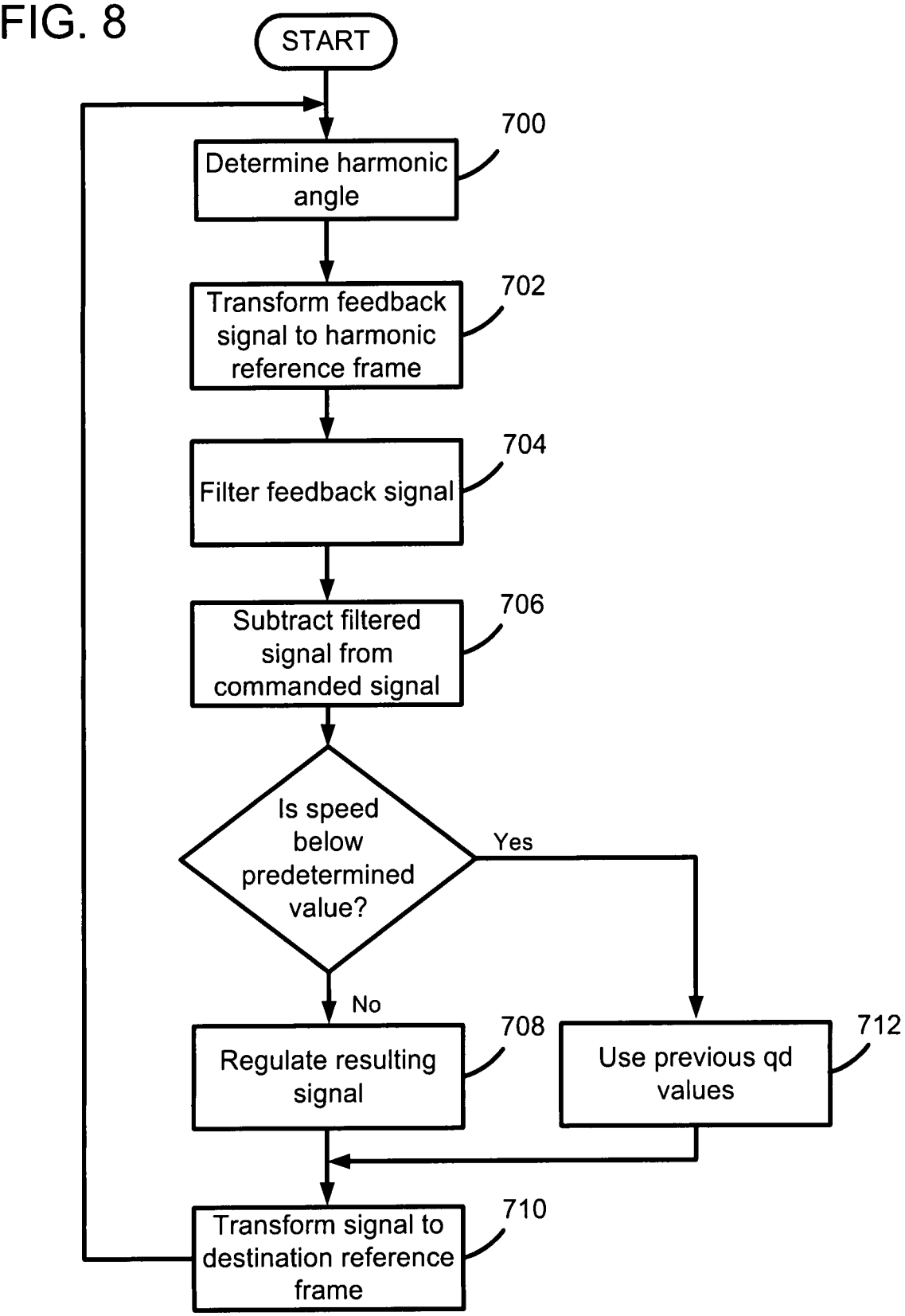
FIG. 8 is a flowchart illustrating the steps performed in one embodiment to regulate one or more harmonics at low speeds.

Note that at low engine speeds, harmonics can be difficult to discern due to the "crowding" of harmonics due to the low fundamental frequency of the system at low speed. In one embodiment, when the engine speed drops below a predetermined speed, the PI block is latched and the qd values are kept to their values that were at or above the predetermined speed (step 712—see FIG. 8). Tests have shown that regulating the harmonics with the latched value is better than if the harmonic disturbance regulator is completely disabled.

Figure 9A:
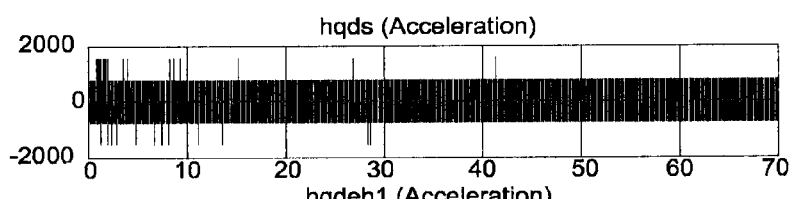
FIGS. 9a-9e are simulated waveforms that illustrate an example of regulating a first harmonic in conjunction with a second harmonic.
Figure 9B:
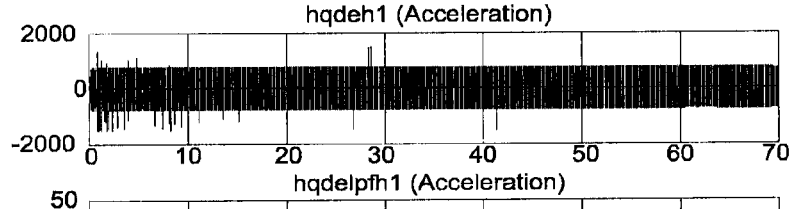
Figure 9C:
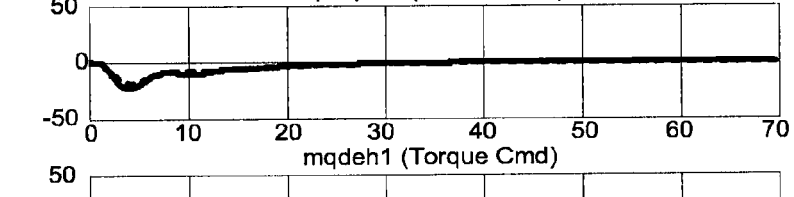
Figure 9D:
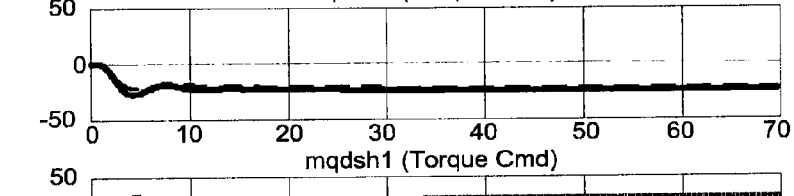
Figure 9E:
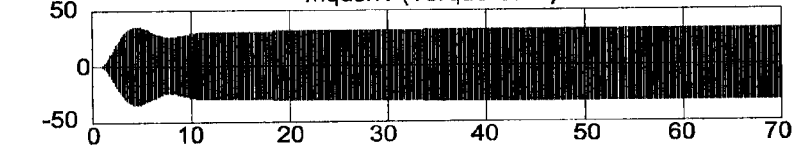
Figure 10A:
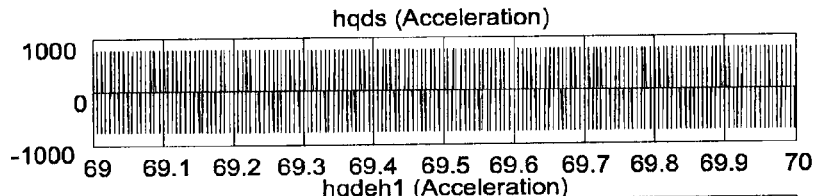
FIGS. 10a-10e are expanded views of the waveforms of FIGS. 9a-9e.
Figure 10B:
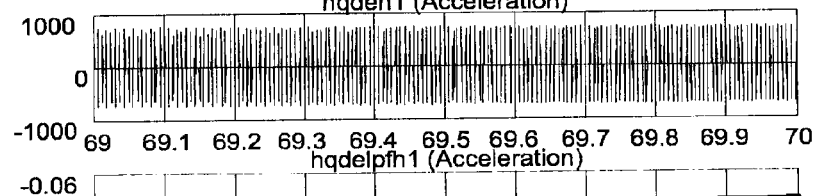
Figure 10C:
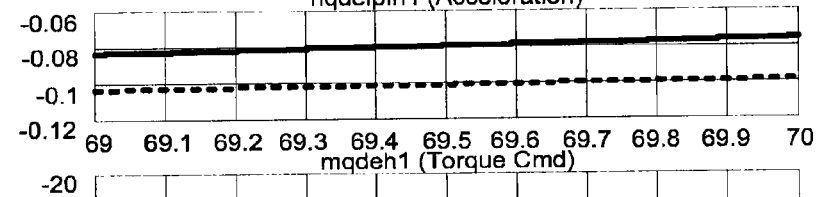
Figure 10D:
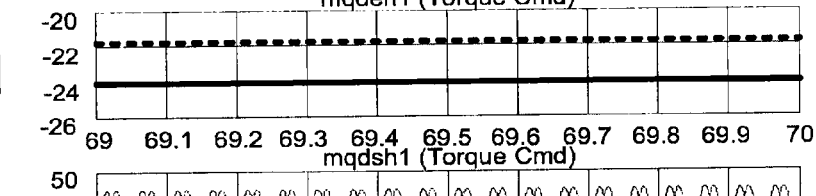
Figure 10E:
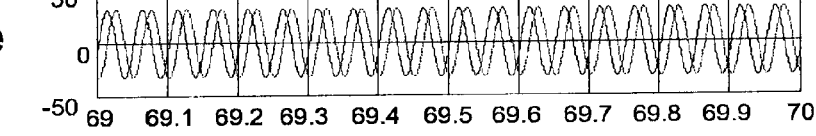
Figure 11A:
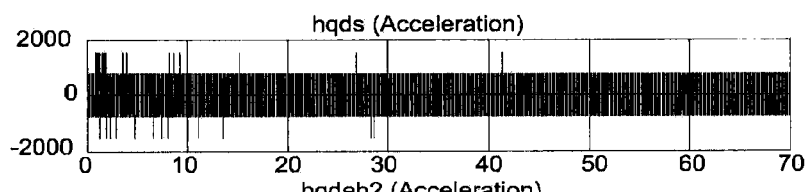
FIGS. 11a-11e are simulated waveforms that illustrate an example of regulating a second harmonic in conjunction with the first harmonic of FIGS. 9a-9e.
Figure 11B:
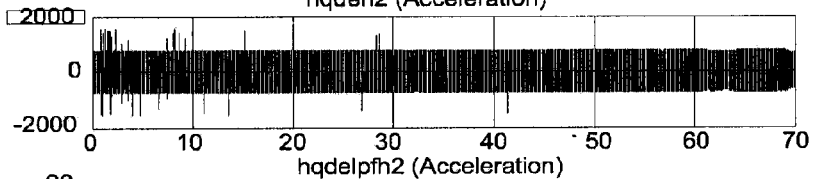
Figure 11C:
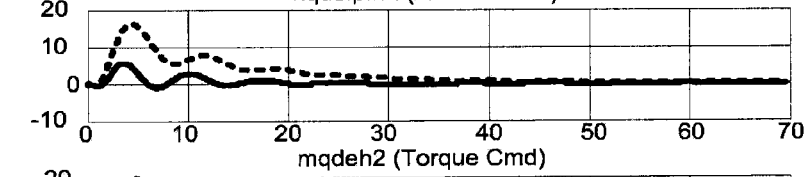
Figure 11D:
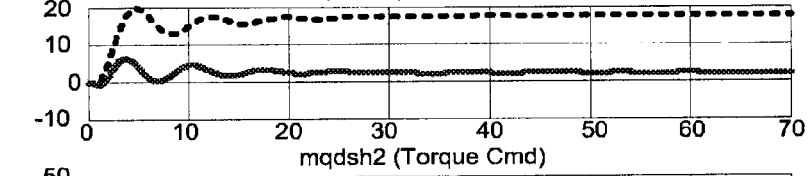
Figure 11E:
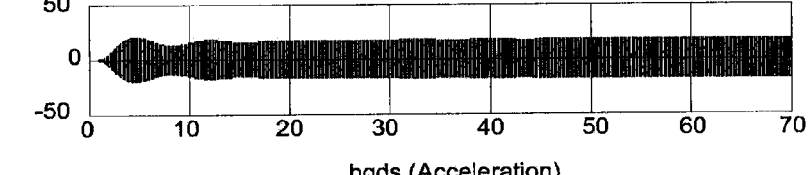
Figure 12A:
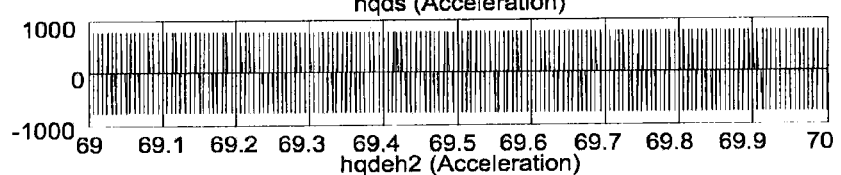
FIGS. 12a-12e are expanded views of the waveforms of FIGS. 11a-11e.
Figure 12B:
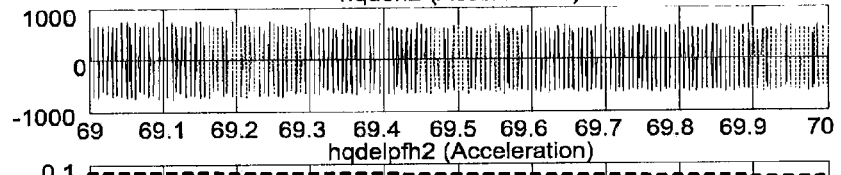
Figure 12C:
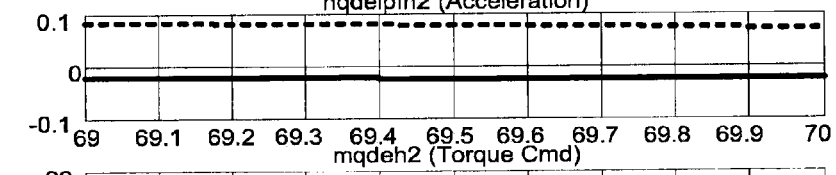
Figure 12D:
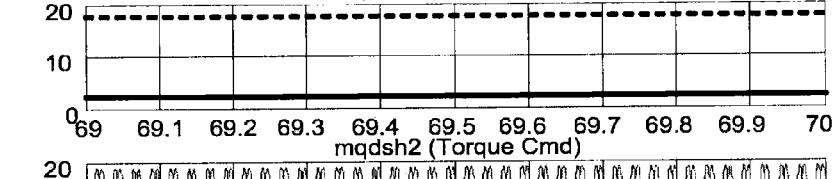
Figure 12E:
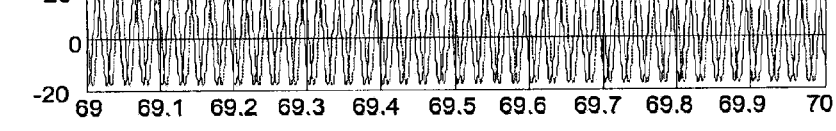

Turning now to FIGS. 9a-12e, a simulated example of regulating two harmonics is shown. FIGS. 10a-10e and FIGS. 12a-12e are expanded views of the waveforms of FIGS. 9a-9e and 11a-11e respectively. FIGS. 9a and 11a are the qd acceleration feedback signals that are quantized similar to how the signals would be when an incremental encoder is used and FIGS. 10a and 12a are expanded views of FIGS. 9a and 11a, respectively. FIGS. 9b and 11b are the transformed qd acceleration signals after being transformed into the harmonic reference frame of harmonic h1 and h2, respectively. FIGS. 10b and 12b are expanded views of FIGS. 9b and 11b, respectively. FIGS. 9c and 11c are the filtered and transformed qd acceleration signals. It can be seen how the filtered terms for both harmonics (i.e., the acceleration errors in this example) are forced to zero by the PI regulator outputs. FIGS. 10c and 12c are expanded views of FIGS. 9c and 11c, respectively. FIGS. 9d and 11d are the filtered and transformed qd acceleration signals after PI regulated. FIGS. 10d and 12d are expanded views of FIGS. 9d and 11d, respectively. It can be seen how each PI regulator output in the harmonic frame corresponds to a different magnitude and phase for each harmonic. FIGS. 9e and 11e are the PI regulated qd acceleration signals after being transformed back into the reference frame of FIGS. 9a and 11a. FIGS. 10e and 12e are expanded views of FIGS. 9e and 11e, respectively.

Figure 13:
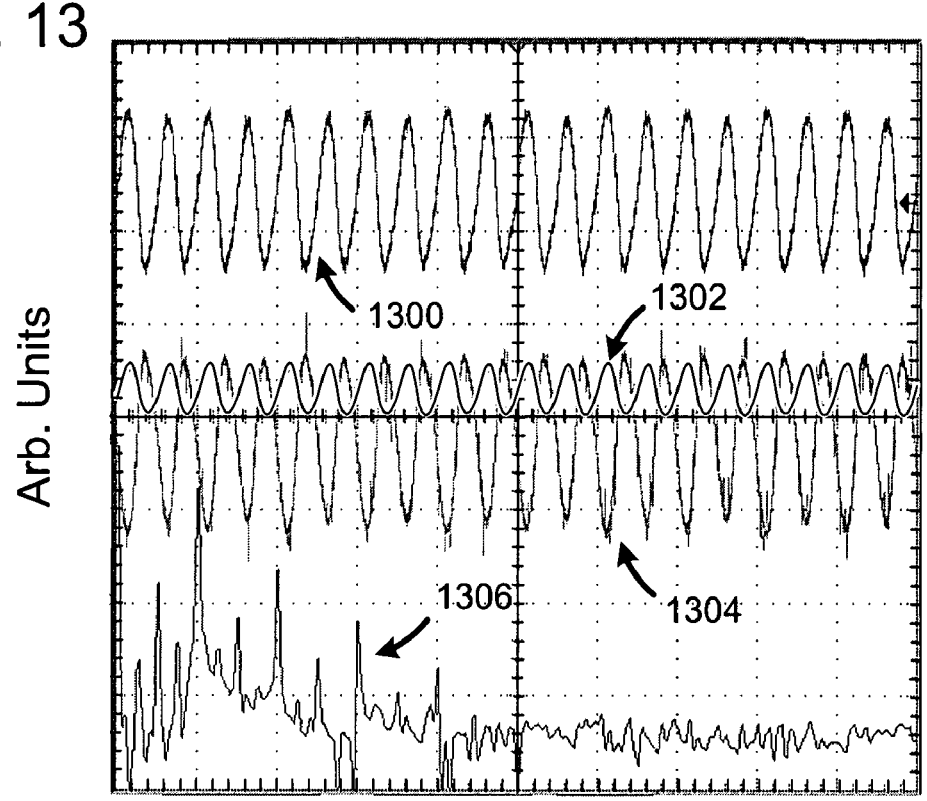
FIG. 13 is an illustration showing the electrical torque estimate, the $qds_{control}$ signal, the motor velocity, and a Fast Fourier Transform (FFT) of the motor velocity in an engine system operating at 300 rpm with the harmonic disturbance regulator disabled.
Figure 14:
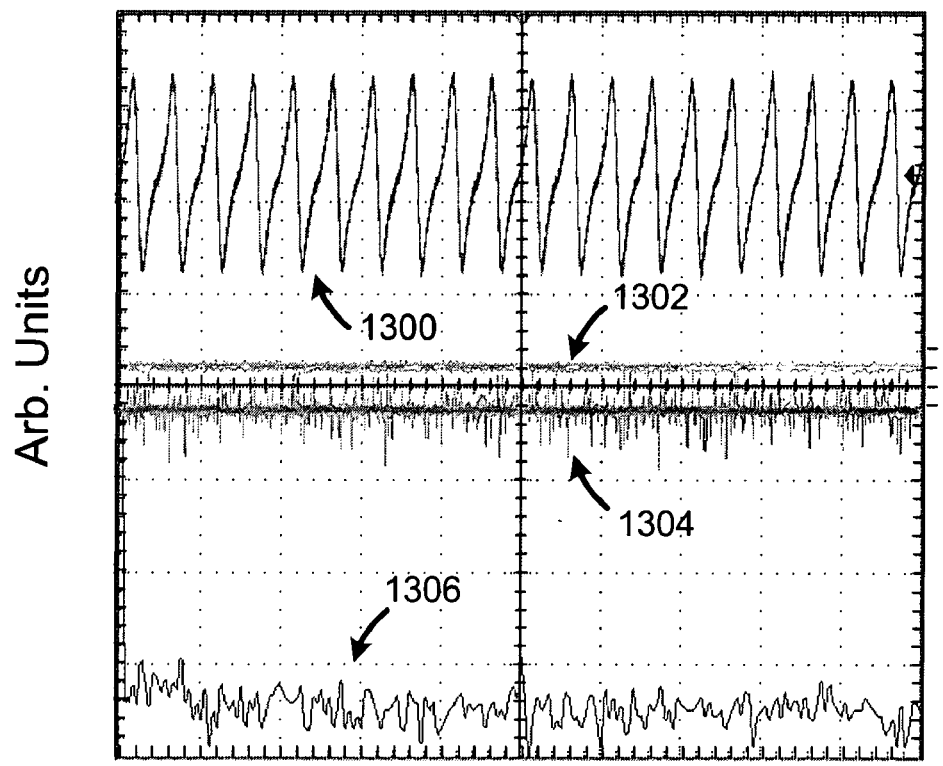
FIG. 14 is an illustration showing the electrical torque estimate, the $qds_{control}$ signal, the motor velocity, and a FFT of the motor velocity in an engine system of FIG. 13 with the harmonic disturbance regulator enabled.

Turning now to FIGS. 13 and 14, an example of regulating the harmonics in a test system of a four cylinder, four cycle engine operating at 300 rpm is illustrated. Waveform 1300 is the electrical torque estimate, waveform 1302 is the $qds_{control}$ signal (FIG. 2), waveform 1304 is the motor velocity, and waveform 1306 is a FFT of motor velocity. FIG. 13 illustrates the waveforms with the harmonic disturbance regulator disabled. Large peak values at several harmonics can clearly be seen in the FFT of the velocity. When the harmonic disturbance regulator is enabled with the regulation setpoint set to a value of zero for the $2^{nd}$, $4^{th}$, $6^{th}$, $8^{th}$, $12^{th}$ and $16^{th}$ harmonics, it can be seen in FIG. 14 that the regulated harmonics have been decoupled in the system and that the motor velocity has little, if any, ripple. As a result, the periodic torque disturbance effects have been reduced and/or eliminated.

Figure 15:
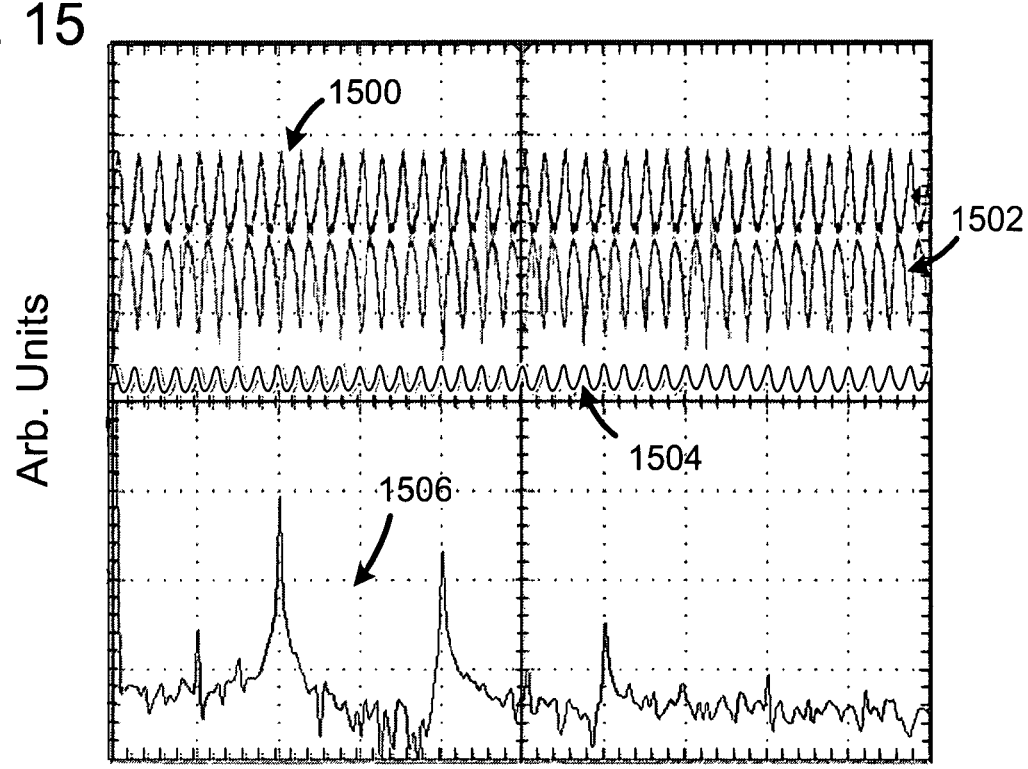
FIG. 15 is an illustration showing the electrical torque estimate, the electrical torque command, the motor velocity, and a FFT of the motor velocity in an engine system operating at 600 rpm with the harmonic disturbance regulator disabled.
Figure 16:
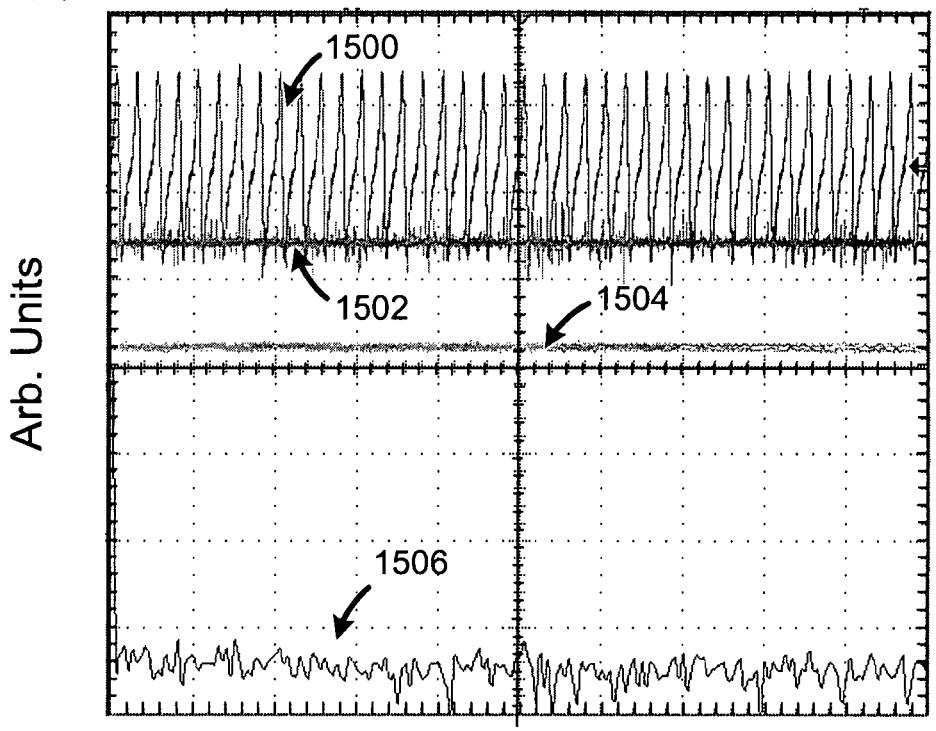
FIG. 16 is an illustration showing the electrical torque estimate, the electrical torque command, the motor velocity, and a FFT of the motor velocity in an engine system of FIG. 15 with the harmonic disturbance regulator enabled.

FIGS. 15 and 16 provide an example of regulating harmonics in the same engine system operating at 600 rpm. Waveform 1500 is the electrical torque estimate, waveform 1502 is the $qds_{control}$ signal (FIG. 2), waveform 1504 is the motor velocity, and waveform 1506 is a FFT of motor velocity. FIG. 15 illustrates the waveforms with the harmonic disturbance regulator disabled. Large peak values at several harmonics can clearly be seen in the FFT of the velocity. When the harmonic disturbance regulator is enabled with the regulation setpoint set to a value of zero for the $2^{nd}$, $4^{th}$, $8^{th}$ and $12^{th}$ harmonics being regulated, it can be seen in FIG. 16 that the regulated harmonics have been decoupled in the system and that the motor velocity has little, if any, ripple. As a result, the periodic torque disturbance effects have been reduced and/or eliminated.

Figures 17, 18:
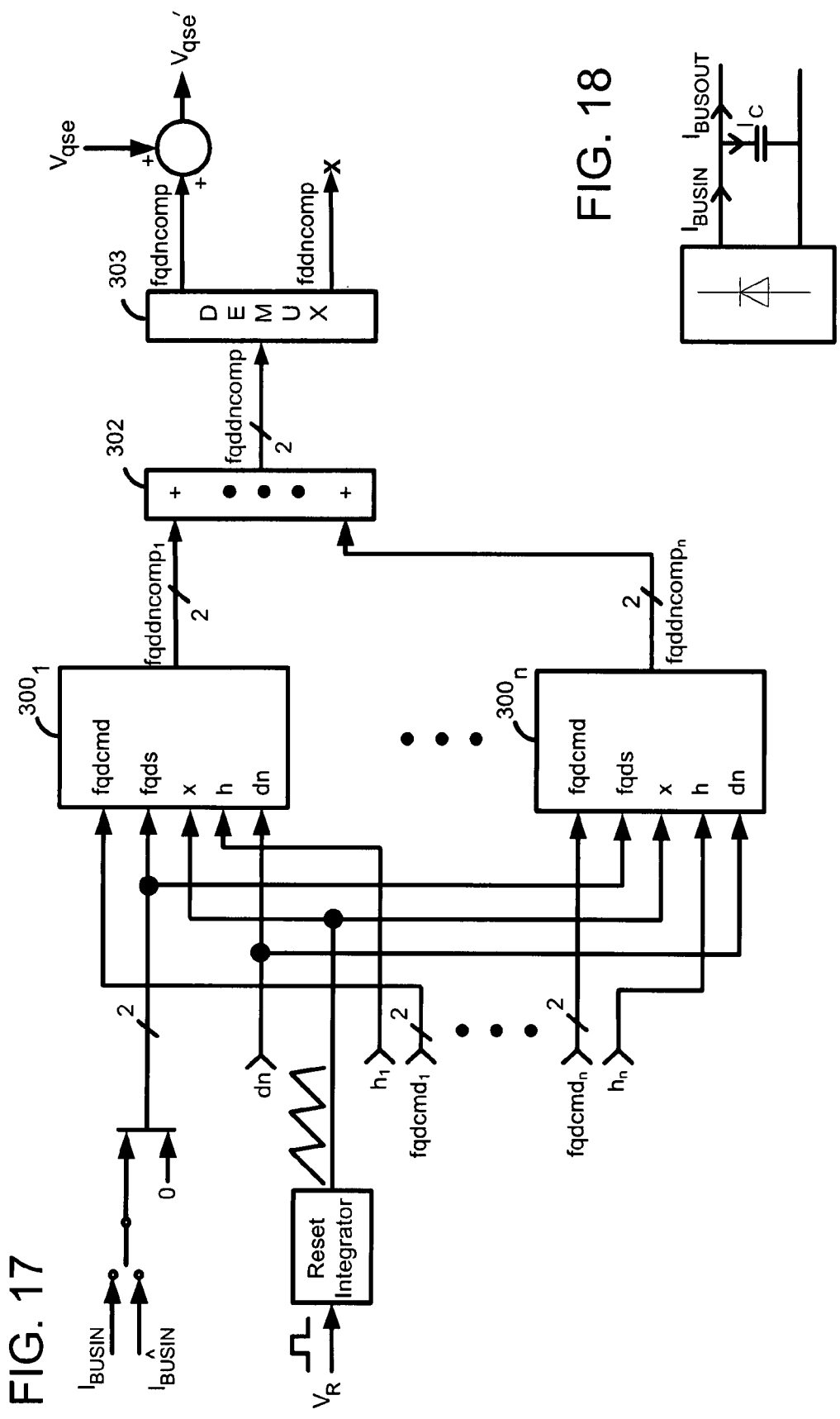
FIG. 17 is a block diagram of an embodiment in which one or more harmonics of the DC bus current of the drive/controller of FIG. 1 is regulated.
FIG. 18 is a block diagram of a portion of a drive that illustrates where the DC bus current is being measured or estimated in the embodiment of FIG. 17.
Figure 19A:
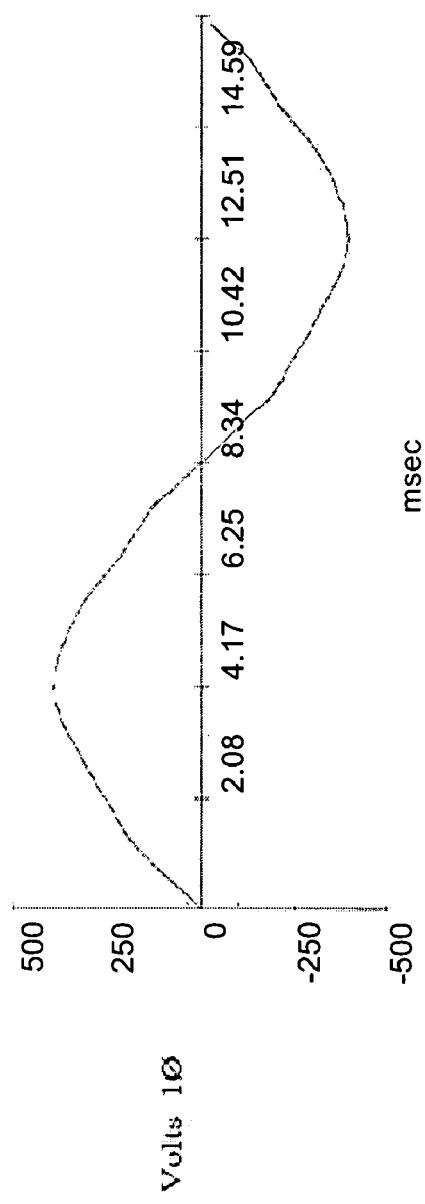
FIGS. 19a-19h illustrate input voltage, input voltage harmonics, input current, input current harmonics, output voltage, output voltage harmonics, output current, and output current harmonics data taken at approximately 60 Hz, 150 Hp without the harmonic damping of FIG. 17 enabled.
Figure 19B:
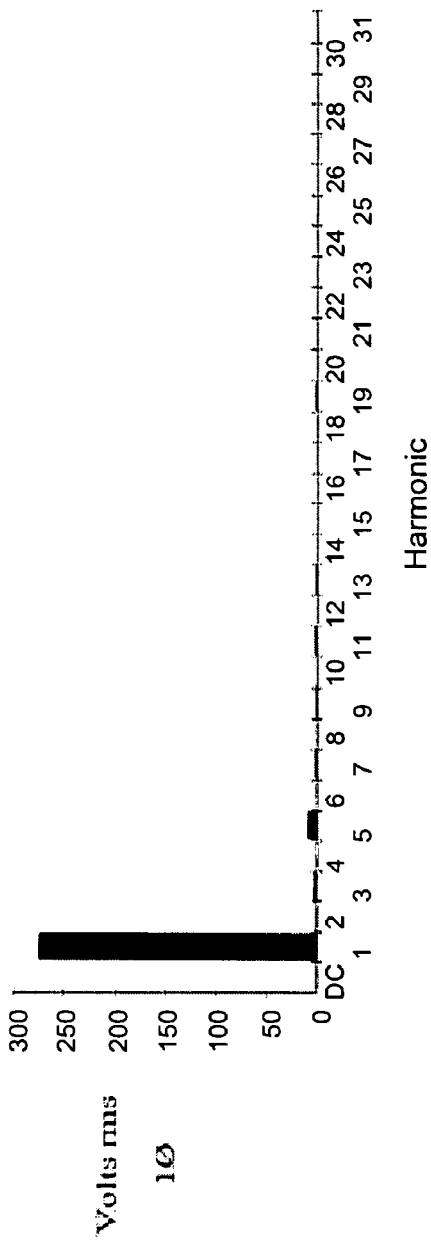
Figure 19C:
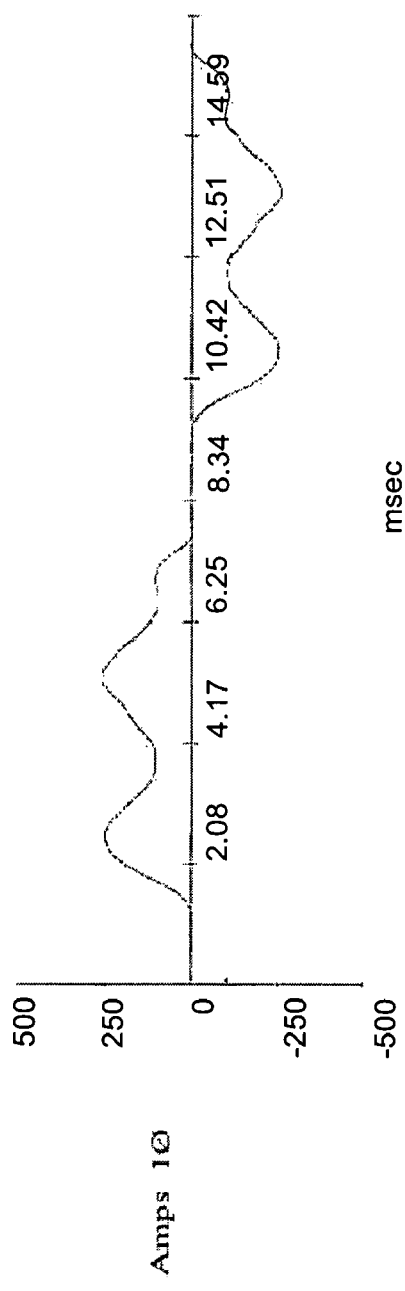
Figure 19D:
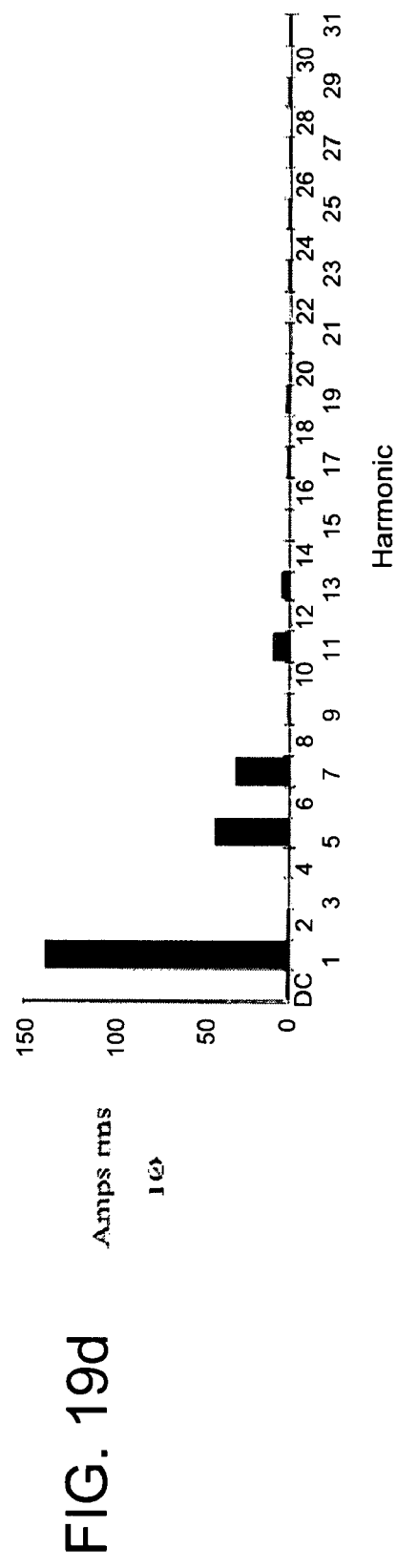
Figure 19E:
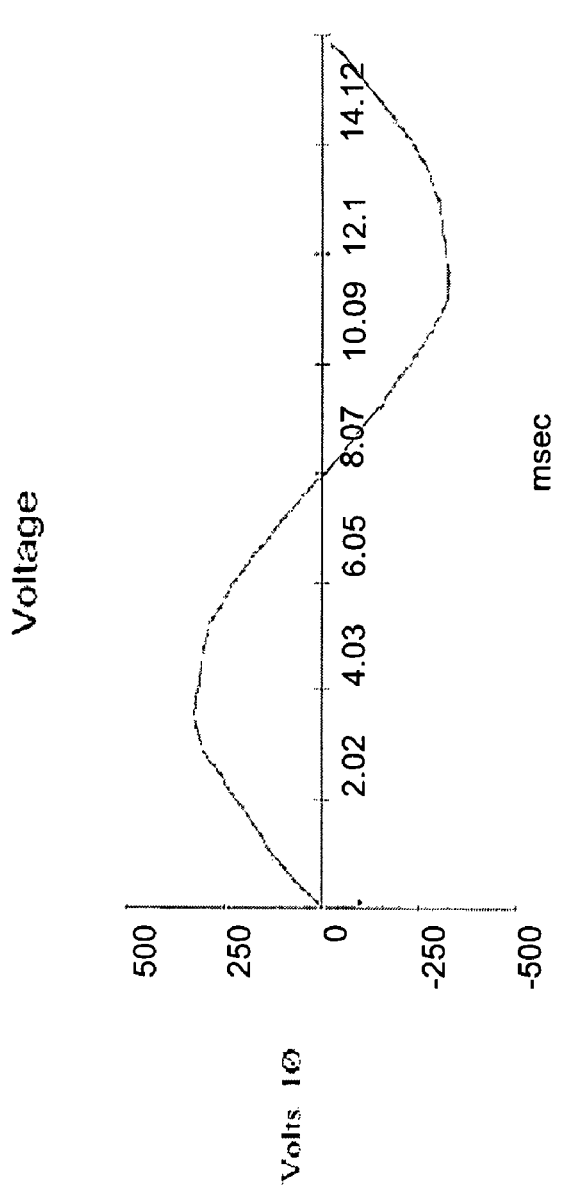
Figure 19F:
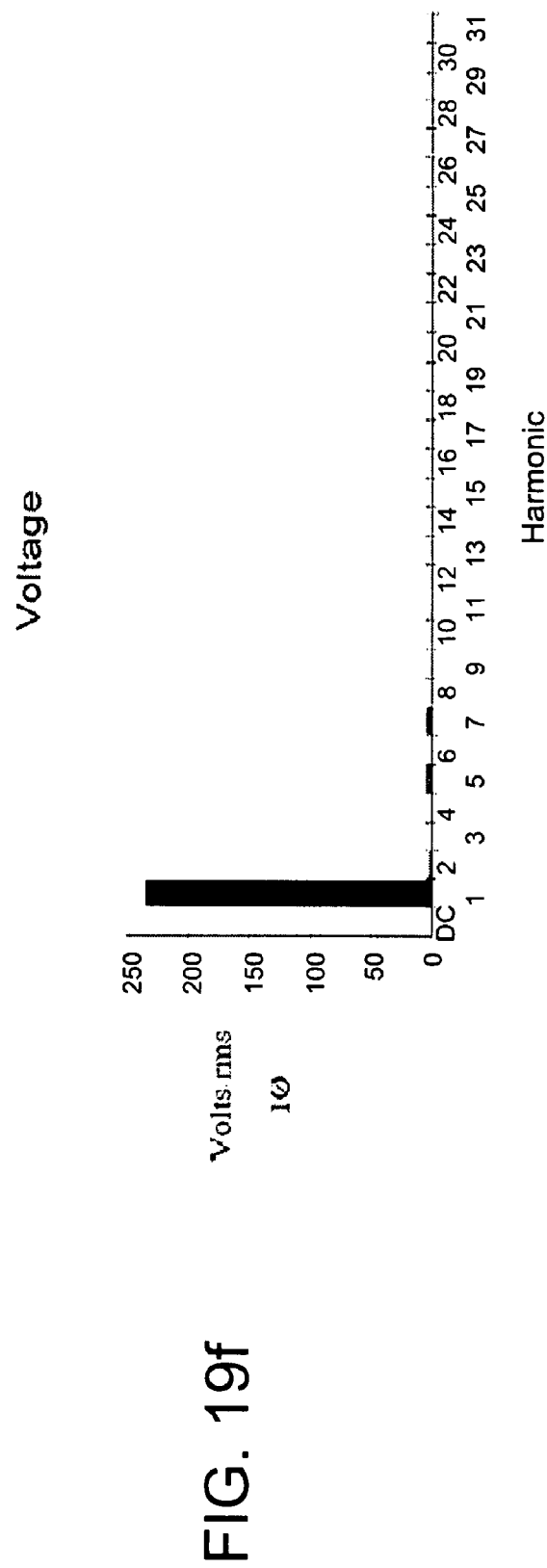
Figure 19G:
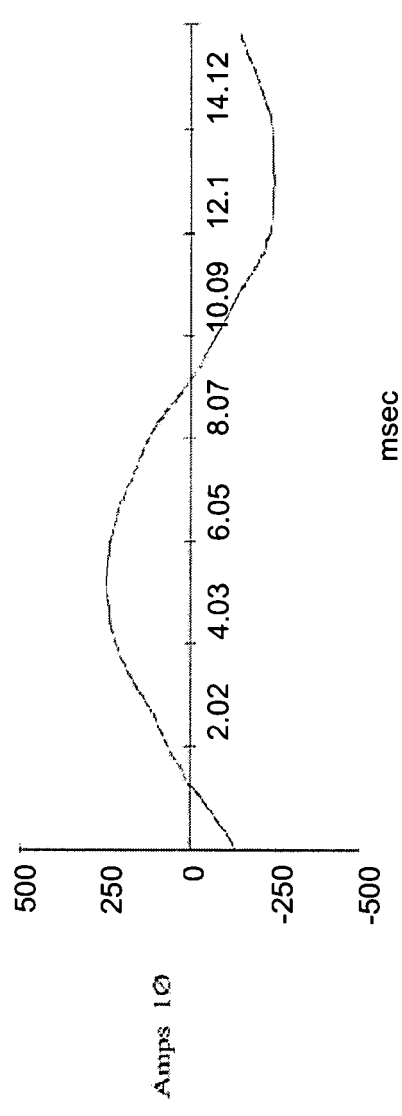
Figure 19H:
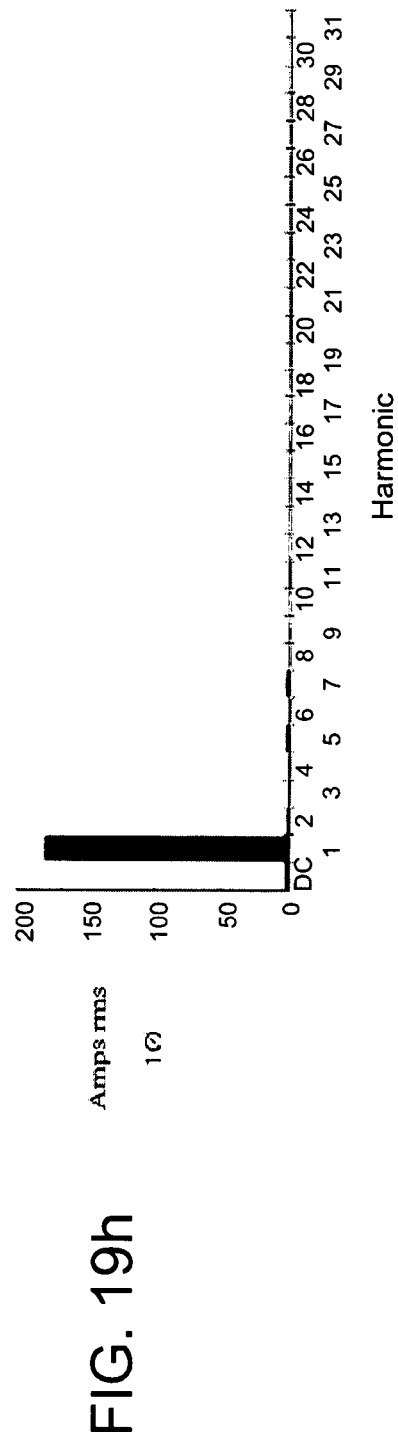
Figure 20A:
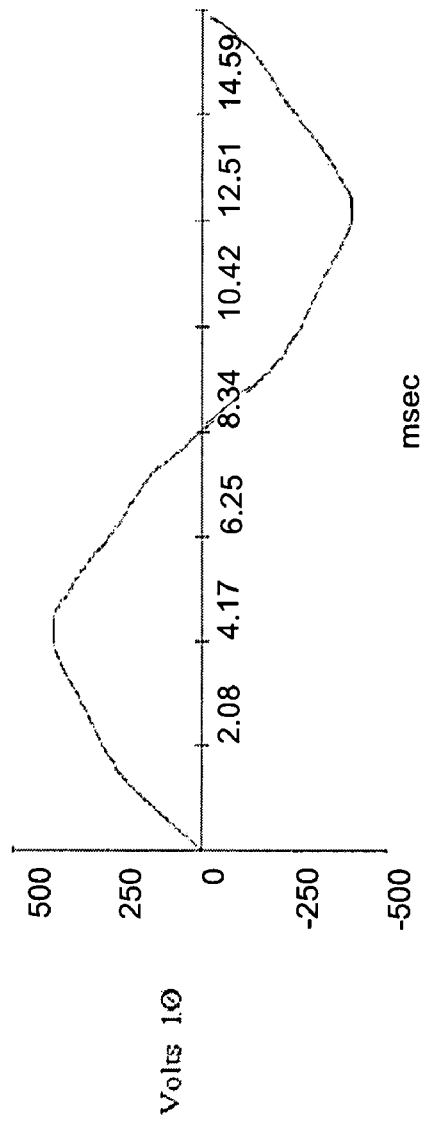
FIGS. 20a-20h illustrate input voltage, input voltage harmonics, input current, input current harmonics, output voltage, output voltage harmonics, output current, and output current harmonics data taken at approximately 60 Hz, 150 Hp with the harmonic damping of FIG. 17 enabled and bus current estimated.
Figure 20B:
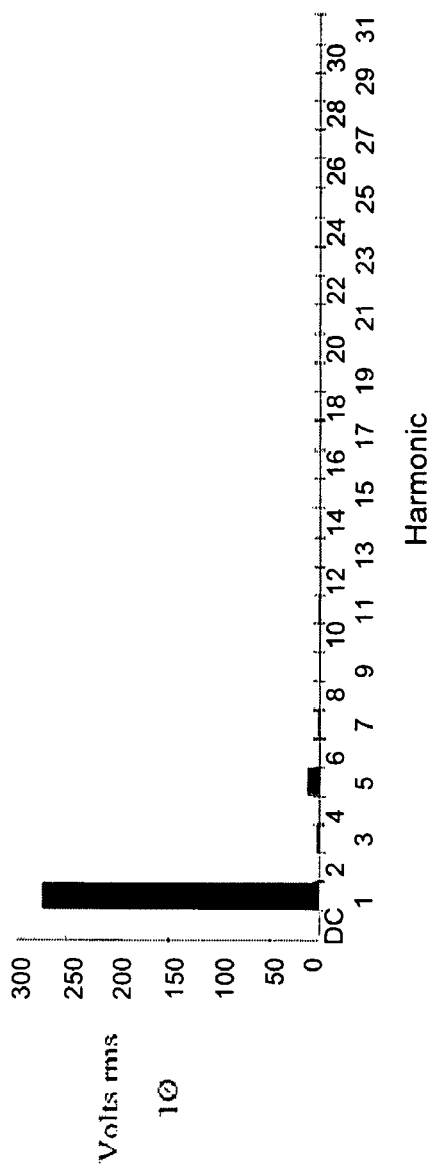
Figure 20C:
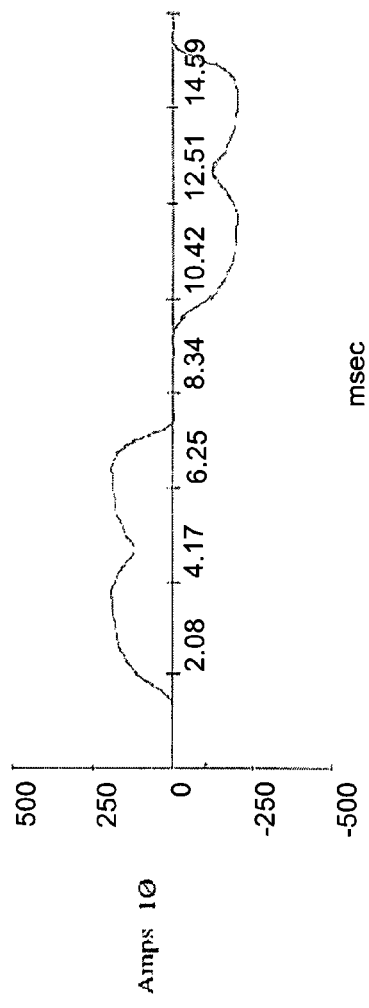
Figure 20D:
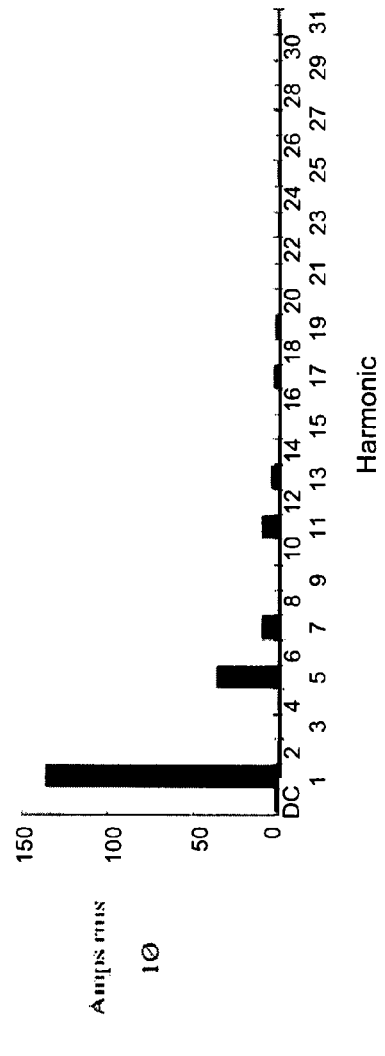
Figure 20E:
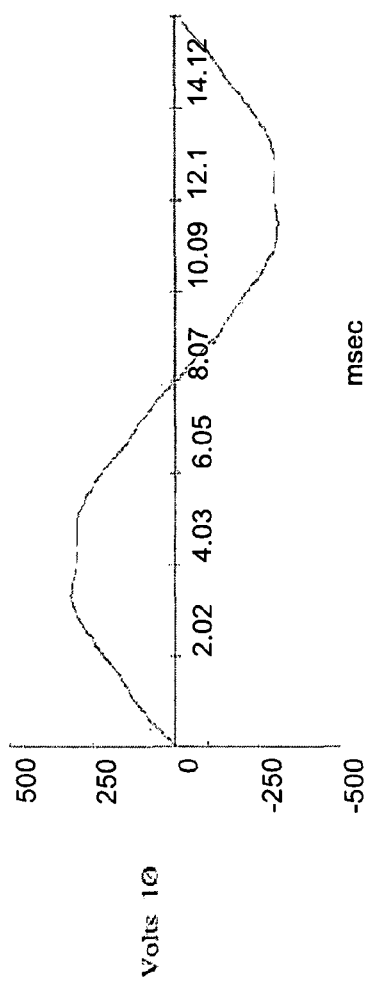
Figure 20F:
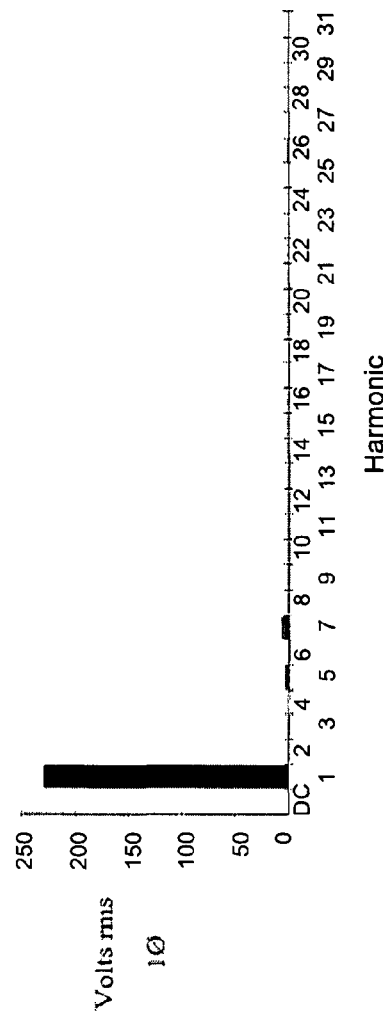
Figure 20G:
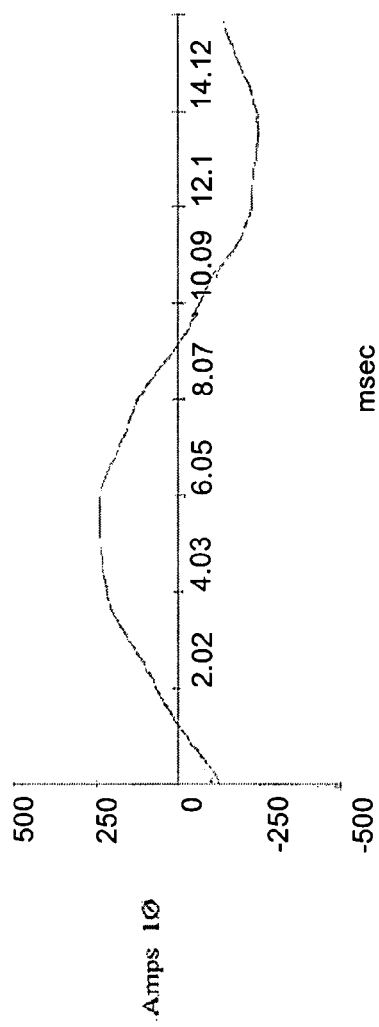
Figure 20H:
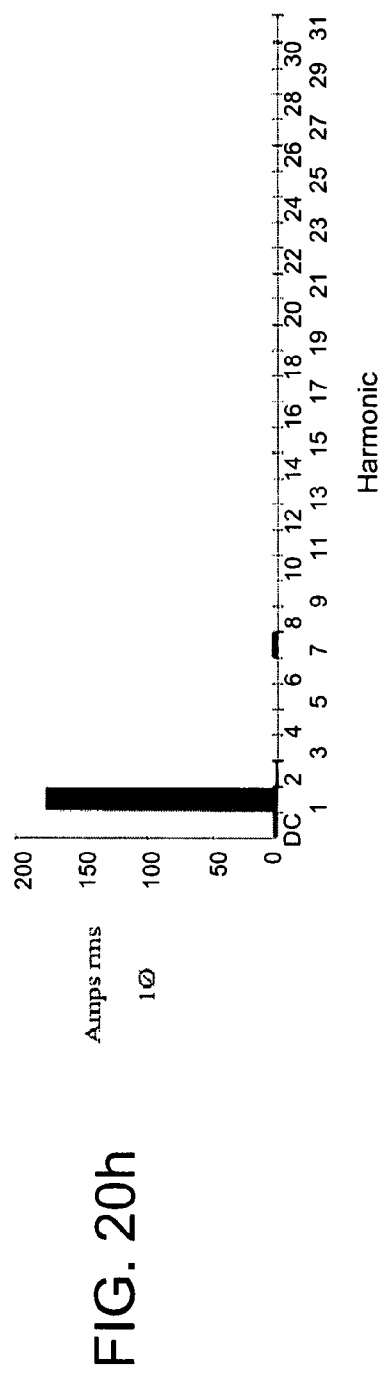
Figure 21A:
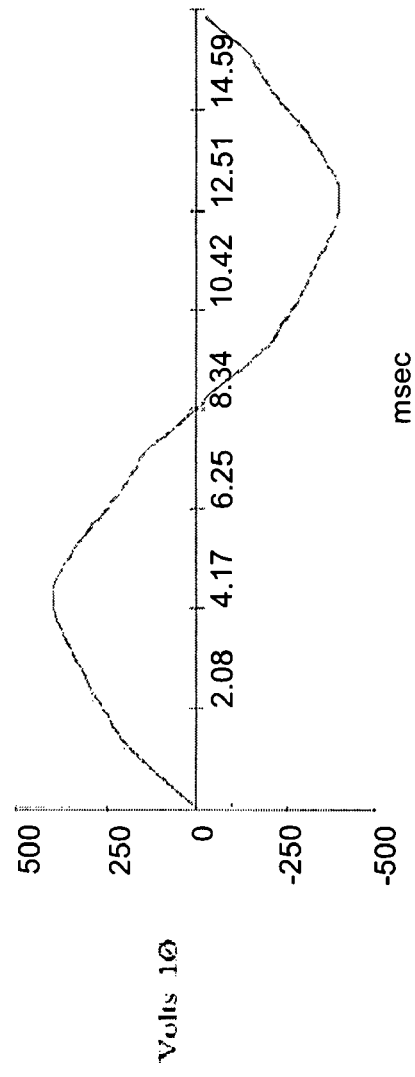
FIGS. 21a-21h illustrate input voltage, input voltage harmonics, input current, input current harmonics, output voltage, output voltage harmonics, output current, and output current harmonics data taken at approximately 60 Hz, 150 Hp with the harmonic damping of FIG. 17 enabled and bus current measured.
Figure 21B:
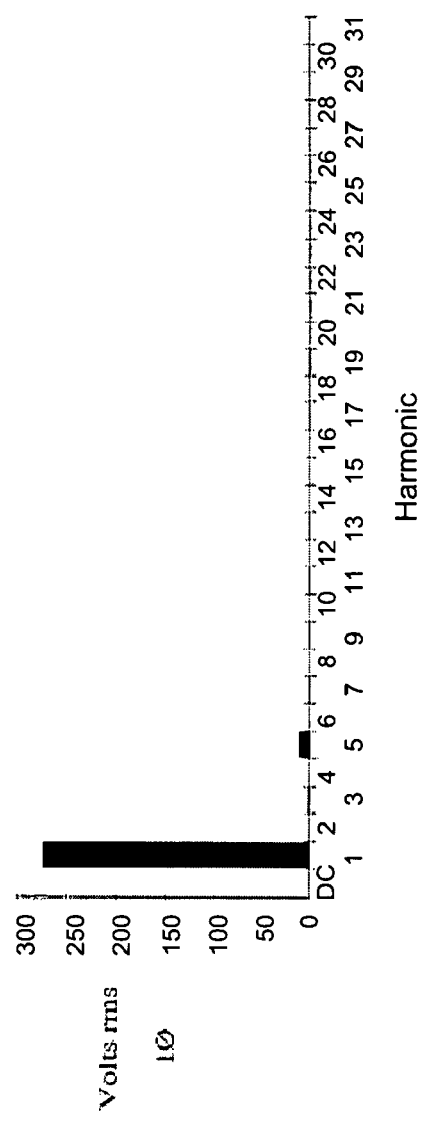
Figure 21C:
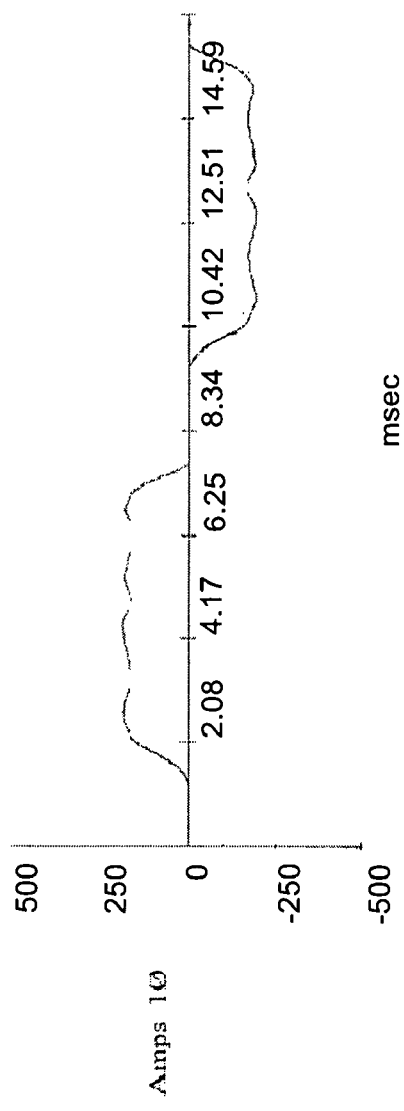
Figure 21D:
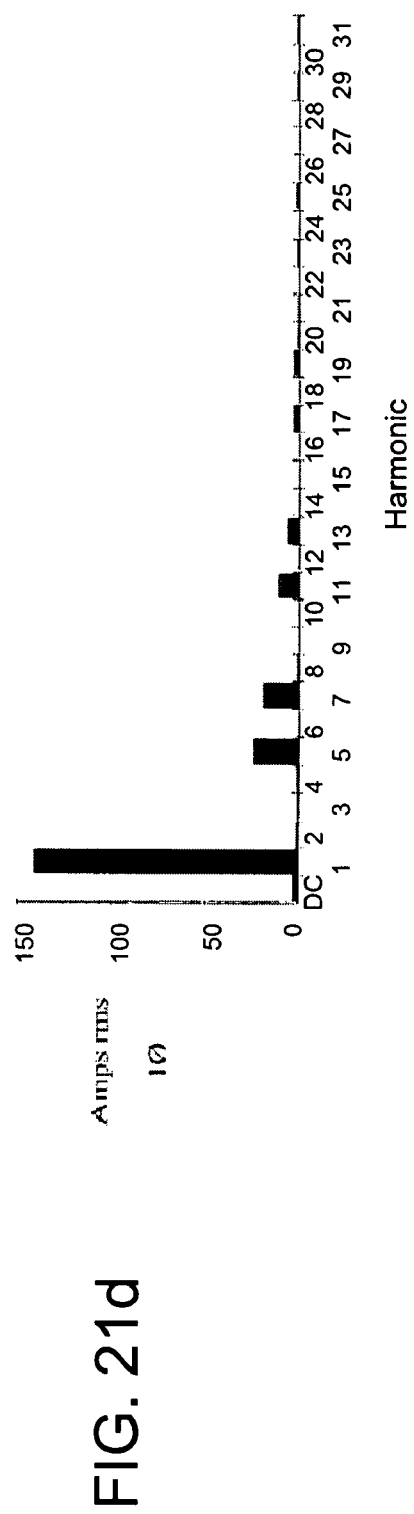
Figure 21E:
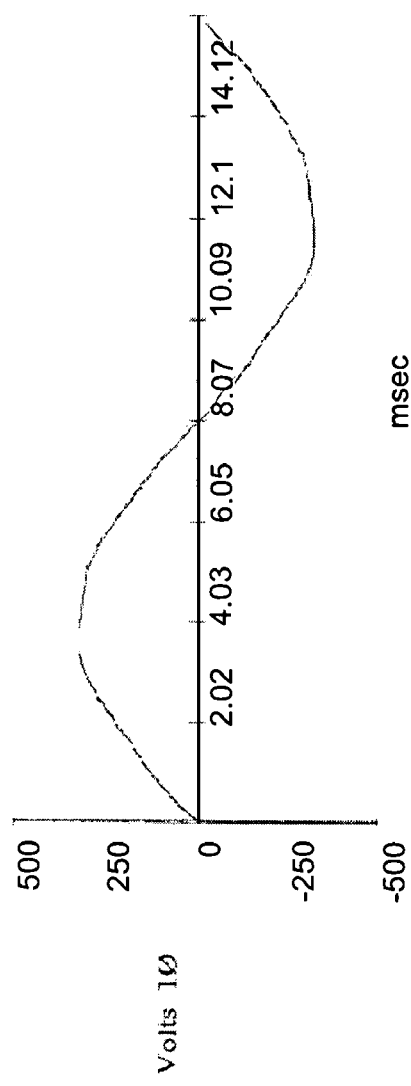
Figure 21F:
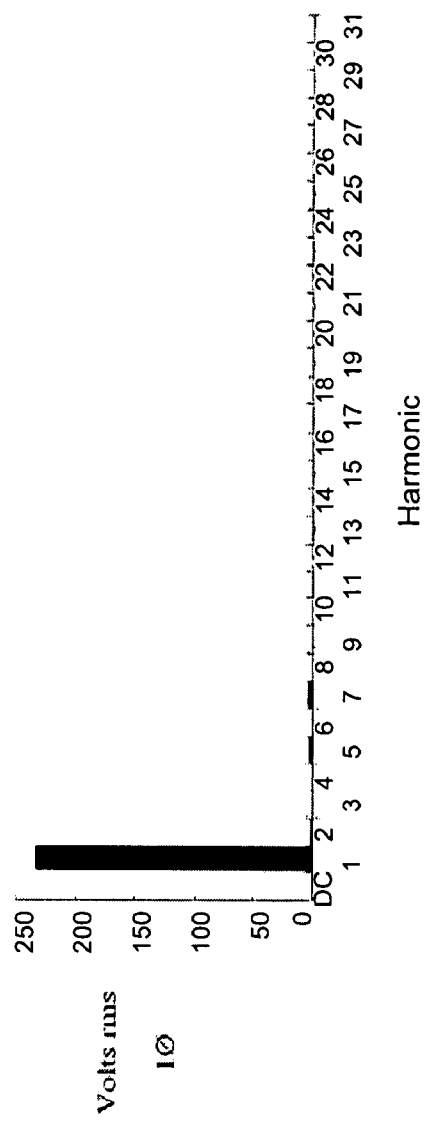
Figure 21G:
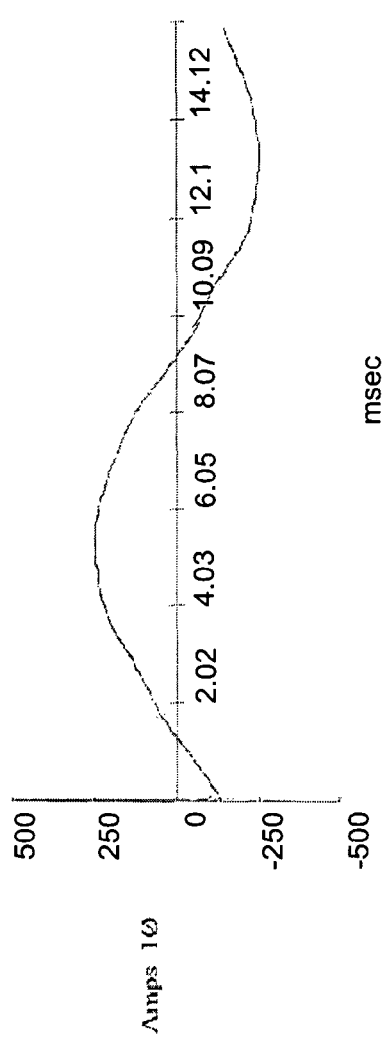
Figure 21H:
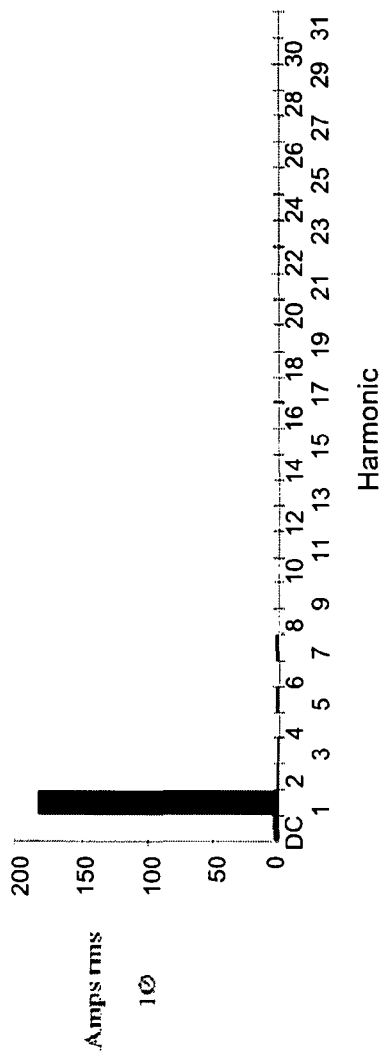
Figure 22A:
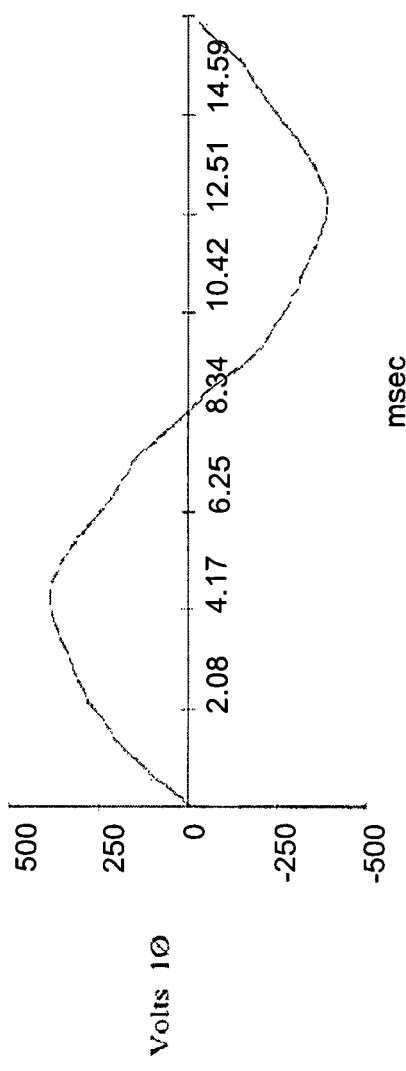
FIGS. 22a-22h illustrate input voltage, input voltage harmonics, input current, input current harmonics, output voltage, output voltage harmonics, output current, and output current harmonics data taken at approximately 60 Hz, 100 Hp with the harmonic damping of FIG. 17 enabled and bus current measured.
Figure 22B:
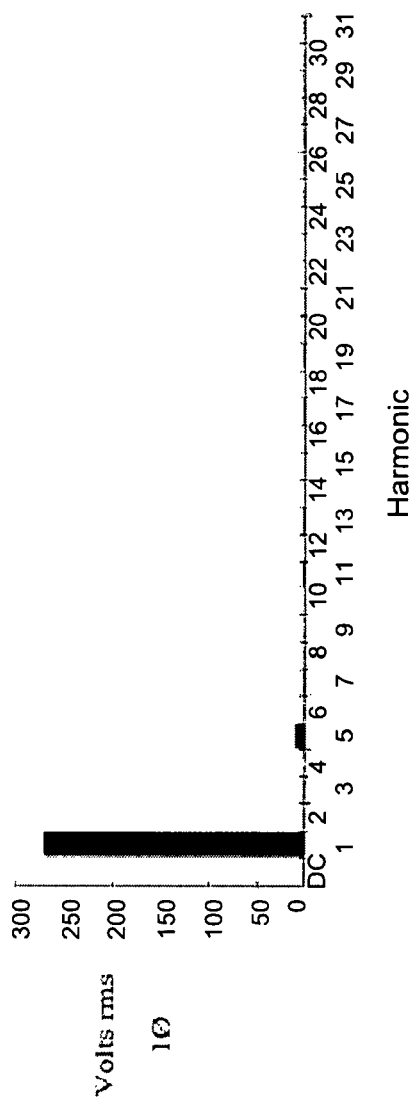
Figure 22C:
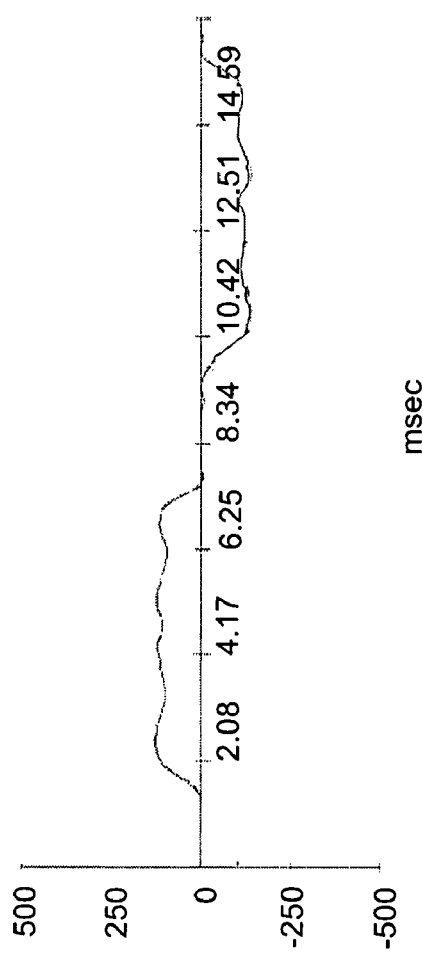
Figure 22D:
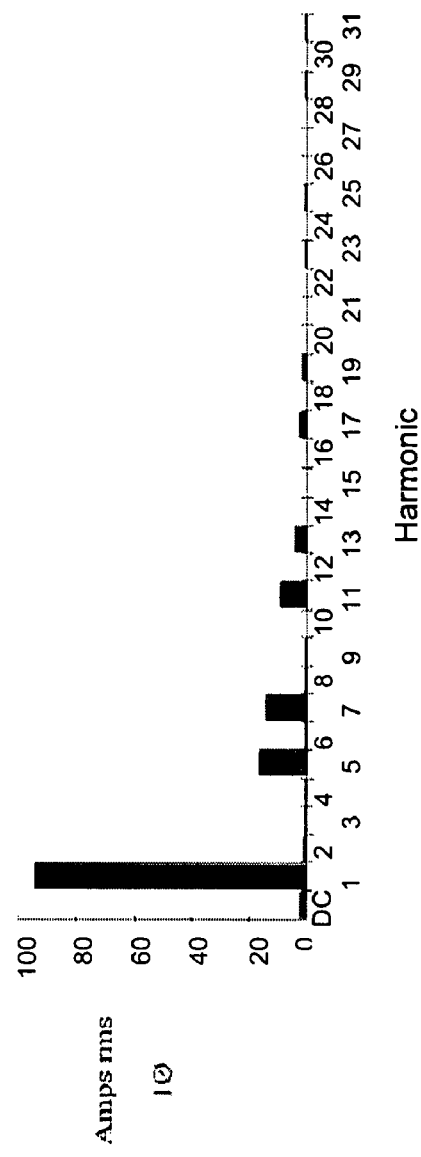
Figure 22E:
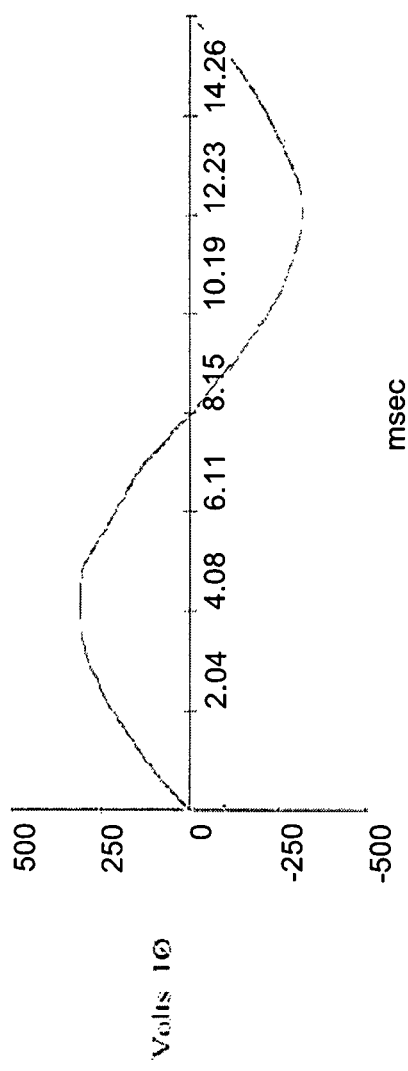
Figure 22F:
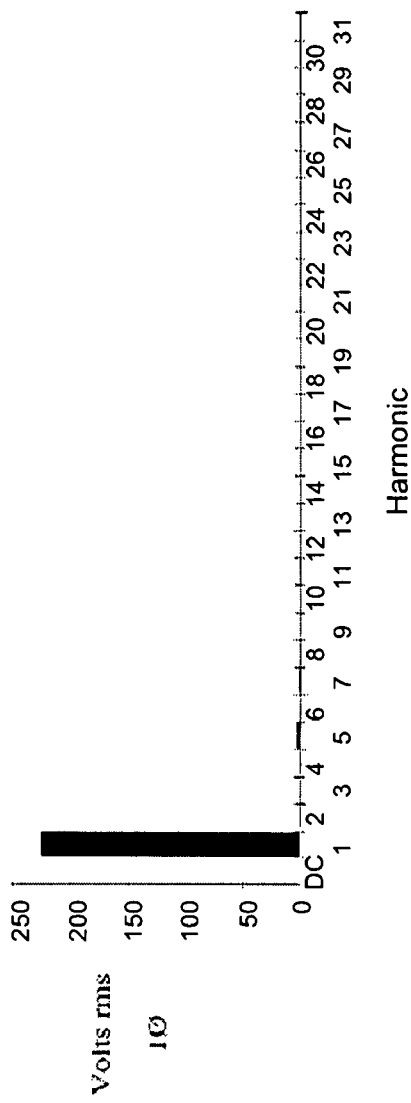
Figure 22G:
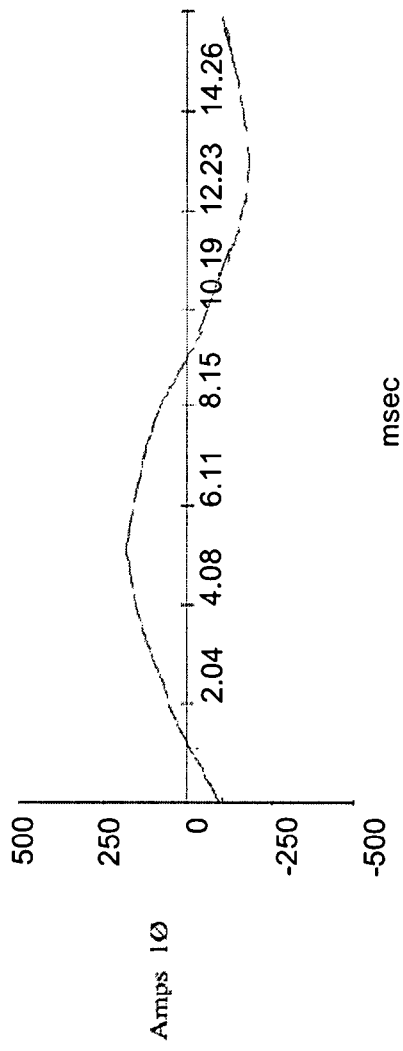
Figure 22H:
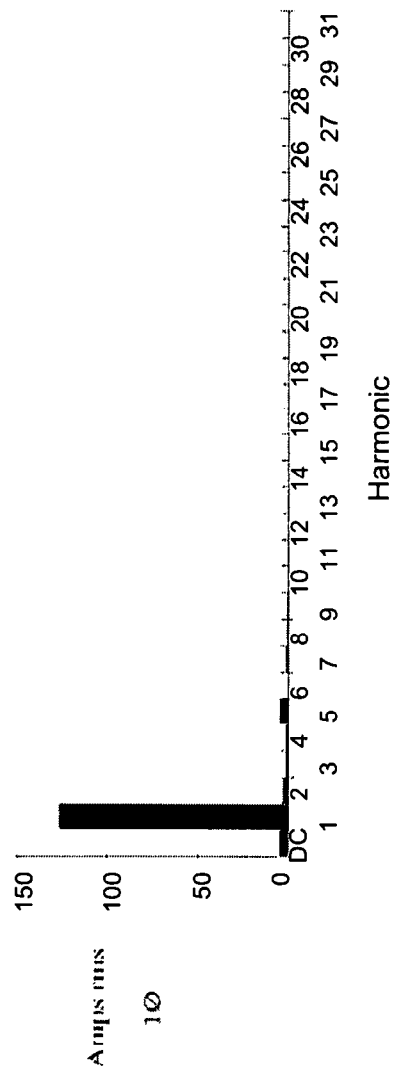
Figure 23A:
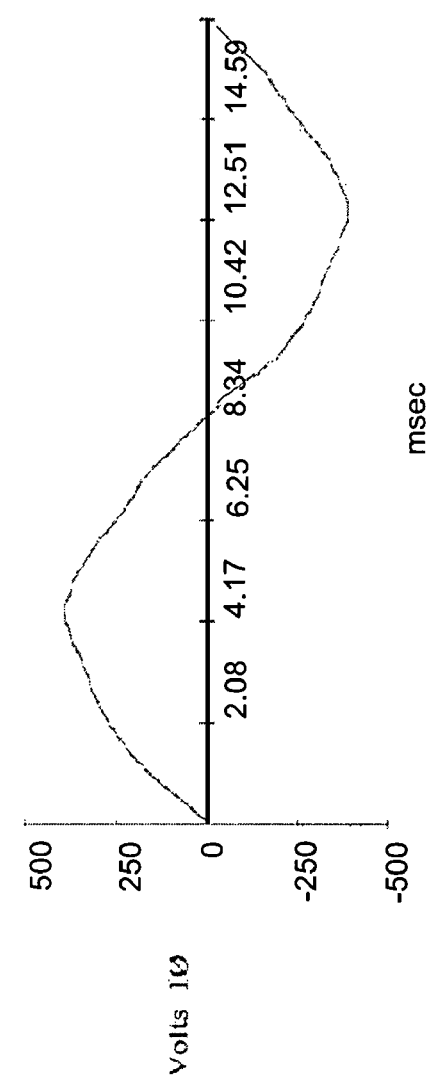
FIGS. 23a-23h illustrate input voltage, input voltage harmonics, input current, input current harmonics, output voltage, output voltage harmonics, output current, and output current harmonics data taken at approximately 60 Hz, 50 Hp with the harmonic damping of FIG. 17 enabled and bus current measured.
Figure 23B:
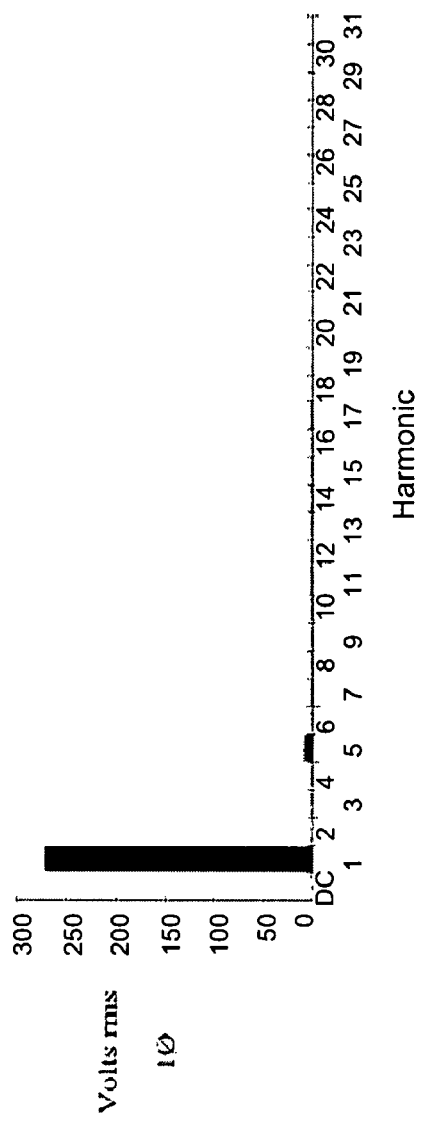
Figure 23C:
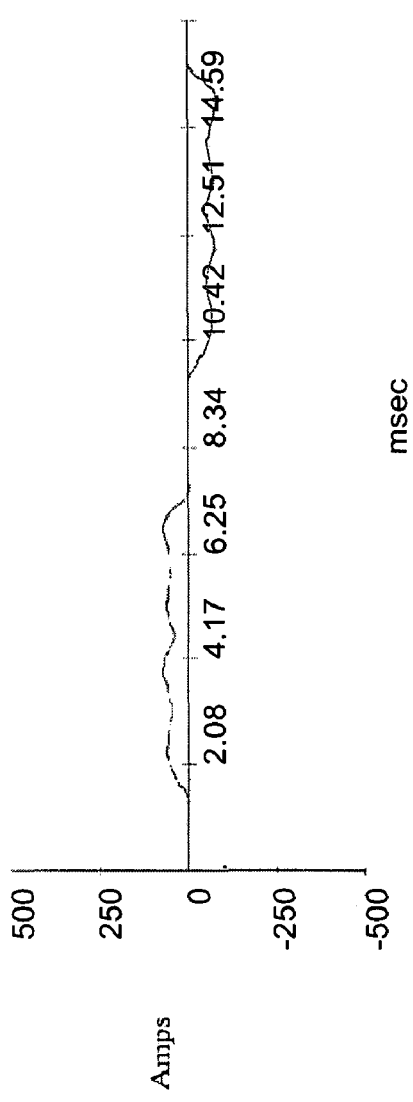
Figure 23D:
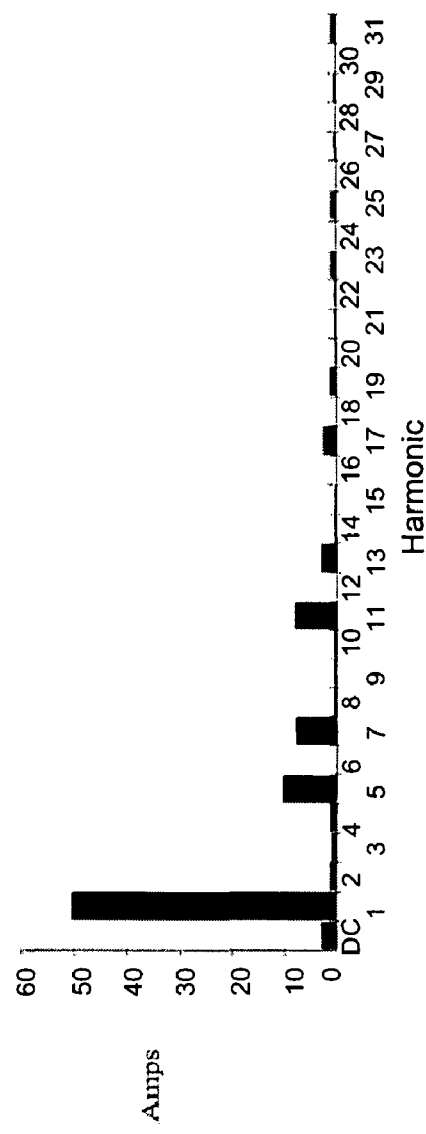
Figure 23E:
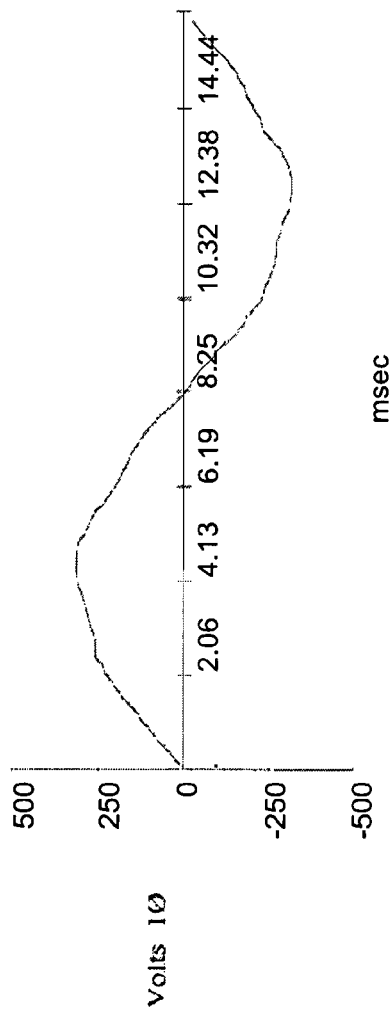
Figure 23F:
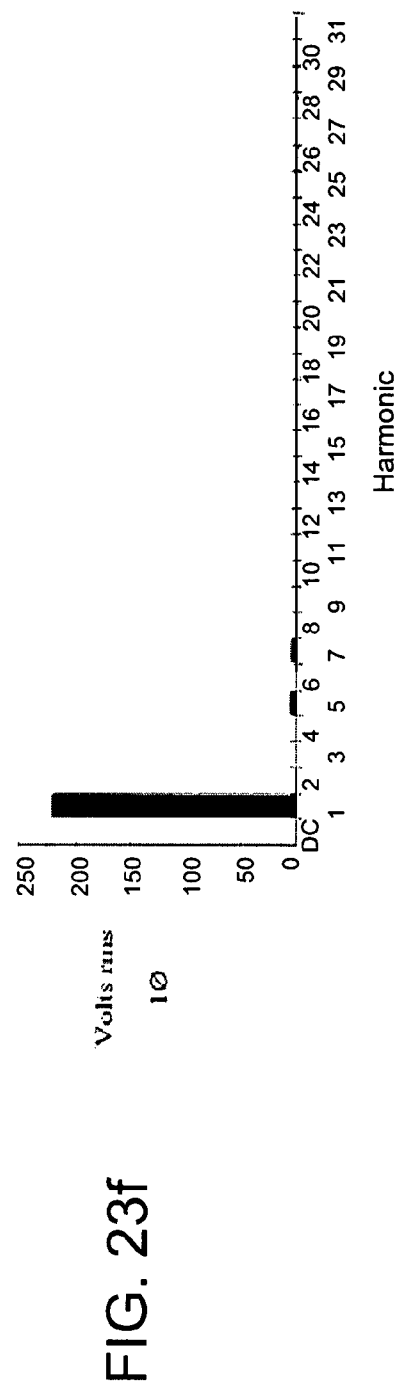
Figure 23G:
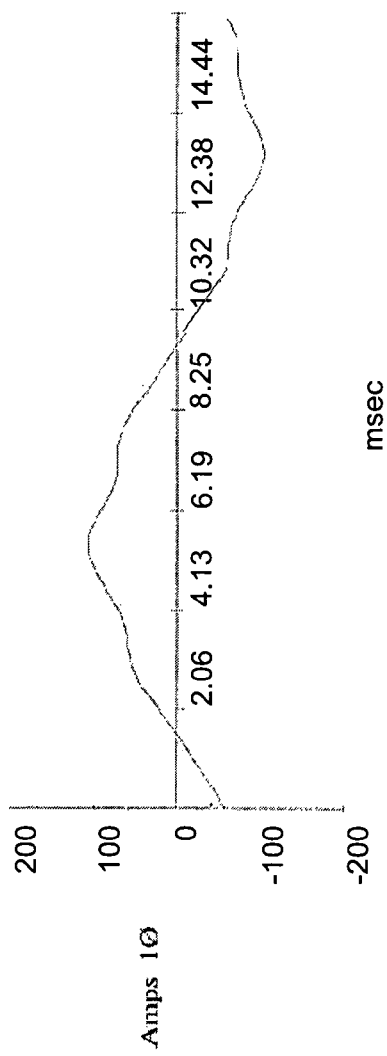
Figure 23H:
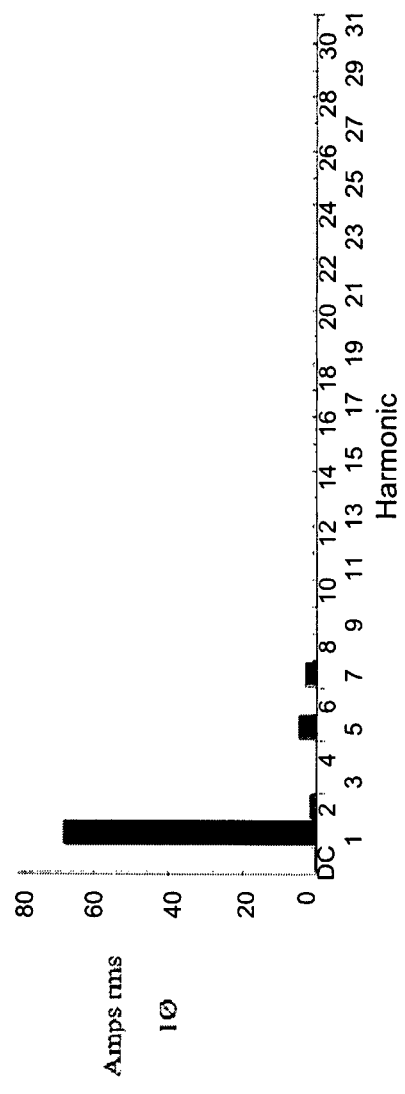

Note that other forms of harmonics can also be regulated with the harmonic disturbance regulator. For example, voltage or current harmonics of a motor drive inverter dc bus and at the input and output connections of motor drive inverters can be reduced using the techniques described herein. Turning now to FIG. 17, an example of regulating dc bus current harmonics is illustrated. One or more harmonics can be targeted. The input to each harmonic regulator 300 is either measured bus in current or estimated bus in current (see FIG. 18). The angle input at which each harmonic being regulated is with respect to the stationary reference frame is generated via an integrator being reset based upon the power source (e.g., 50 or 60 Hz). For example, a sine wave representing the voltage of an input phase could be used with zero cross detection that is used to reset the integrator. The outputs of the harmonic regulators 300 are summed in summing block 302. The two dimensional vector output fqddncomp is input to the demultiplexor block 303, resulting in fqddncomp being separated into its component scalar values of fqdncomp and fddncomp. The fddncomp component output of demultiplexor block 303 is not used. The fqdncomp component output of the demultiplexor block 303 is added to the main control loop and commands $V_{qse}$ synchronous frame voltage to the motor to accomplish the reduction in bus current harmonics. Typically, the 6th harmonic and harmonics that are multiples of 6 are regulated.

It is well known that a conventional motor drive with a six pulse diode rectifier front end deriving its power from a three-phase source without any significant input inductance has a total harmonic distortion (THD) of 31%. Turning now to FIGS. 19a-23h, test data of a 100 Hp, 460V Series 1200 Drive from Unico, assignee of this patent application, that has been modified with the harmonic damping techniques described herein are shown.

FIGS. 19a-19h illustrate data taken at approximately 60 Hz, 150 Hp without harmonic damping. In FIGS. 19a-19h, input voltage (FIG. 19a), input voltage harmonics (FIG. 19b), input current (FIG. 19c), input current harmonics (FIG. 19d), output voltage (FIG. 19e), output voltage harmonics (FIG. 19f), output current (FIG. 19g), and output current harmonics (FIG. 19h) are shown. Measurement at the inputs showed THD was 3.52% of the rms voltage and 36.46% of the rms current. Measurement at the outputs showed THD was 2.71% of the rms voltage and 3.29% of the rms current.

FIGS. 20a-20h illustrate data taken at approximately 60 Hz, 150 Hp with harmonic damping enabled and bus current being estimated. In FIGS. 20a-20h, input voltage (FIG. 20a), input voltage harmonics (FIG. 20b), input current (FIG. 20c), input current harmonics (FIG. 20d), output voltage (FIG. 20e), output voltage harmonics (FIG. 20f), output current (FIG. 20g), and output current harmonics (FIG. 20h) are shown. Measurement at the inputs showed THD was 4.70% of the rms voltage and 28.12% of the rms current. Measurement at the outputs showed THD was 3.39% of the rms voltage and 3.21% of the rms current.

FIGS. 21a-21h illustrate data taken at approximately 60 Hz, 150 Hp with harmonic damping and bus current being measured. In FIGS. 21a-21h, input voltage (FIG. 21a), input voltage harmonics (FIG. 21b), input current (FIG. 21c), input current harmonics (FIG. 21d), output voltage (FIG. 21e), output voltage harmonics (FIG. 21f), output current (FIG. 21g), and output current harmonics (FIG. 21h) are shown. Measurement at the inputs showed THD was 4.31% of the rms voltage and 23.23% of the rms current. Measurement at the outputs showed THD was 2.42% of the rms voltage and 2.90% of the rms current.

FIGS. 22a-22h illustrate data taken at approximately 60 Hz, 100 Hp with harmonic damping and bus current being measured. In FIGS. 22a-22h, input voltage (FIG. 22a), input voltage harmonics (FIG. 22b), input current (FIG. 22c), input current harmonics (FIG. 22d), output voltage (FIG. 22e), output voltage harmonics (FIG. 22f), output current (FIG. 22g), and output current harmonics (FIG. 22h) are shown. Measurement at the inputs showed THD was 3.84% of the rms voltage and of the 25.47% rms current. Measurement at the outputs showed THD was 2.04% of the rms voltage and 4.07% of the rms current.

FIGS. 23a-23h illustrate data taken at approximately 60 Hz, 50 Hp with harmonic damping and bus current being measured. In FIGS. 23a-23h, input voltage (FIG. 23a), input voltage harmonics (FIG. 23b), input current (FIG. 23c), input current harmonics (FIG. 23d), output voltage (FIG. 23e), output voltage harmonics (FIG. 23f), output current (FIG. 23g), and output current harmonics (FIG. 23h) are shown. Measurement at the inputs showed THD was 3.54% of the rms voltage and 29.94% of the rms current. Measurement at the outputs showed THD was 4.14% of the rms voltage and 9.35% of the rms current.

It can be seen that the current harmonics are reduced with the use of the harmonic damping with either the input bus current being measured or estimated. Harmonics could potentially be reduced even further using the invention in conjunction with other harmonic mitigation techniques such as, for example, using filters or using autotransformers such as those shown in U.S. Pat. Nos. 7,049,921 and 5,455,759 and in the article entitled "Cost effective Multi-Pulse Transformer Solutions for Harmonic Mitigation in AC Drives" by Gary L. Skibinski, all of which are hereby incorporated in their entireties.

Figure 24:
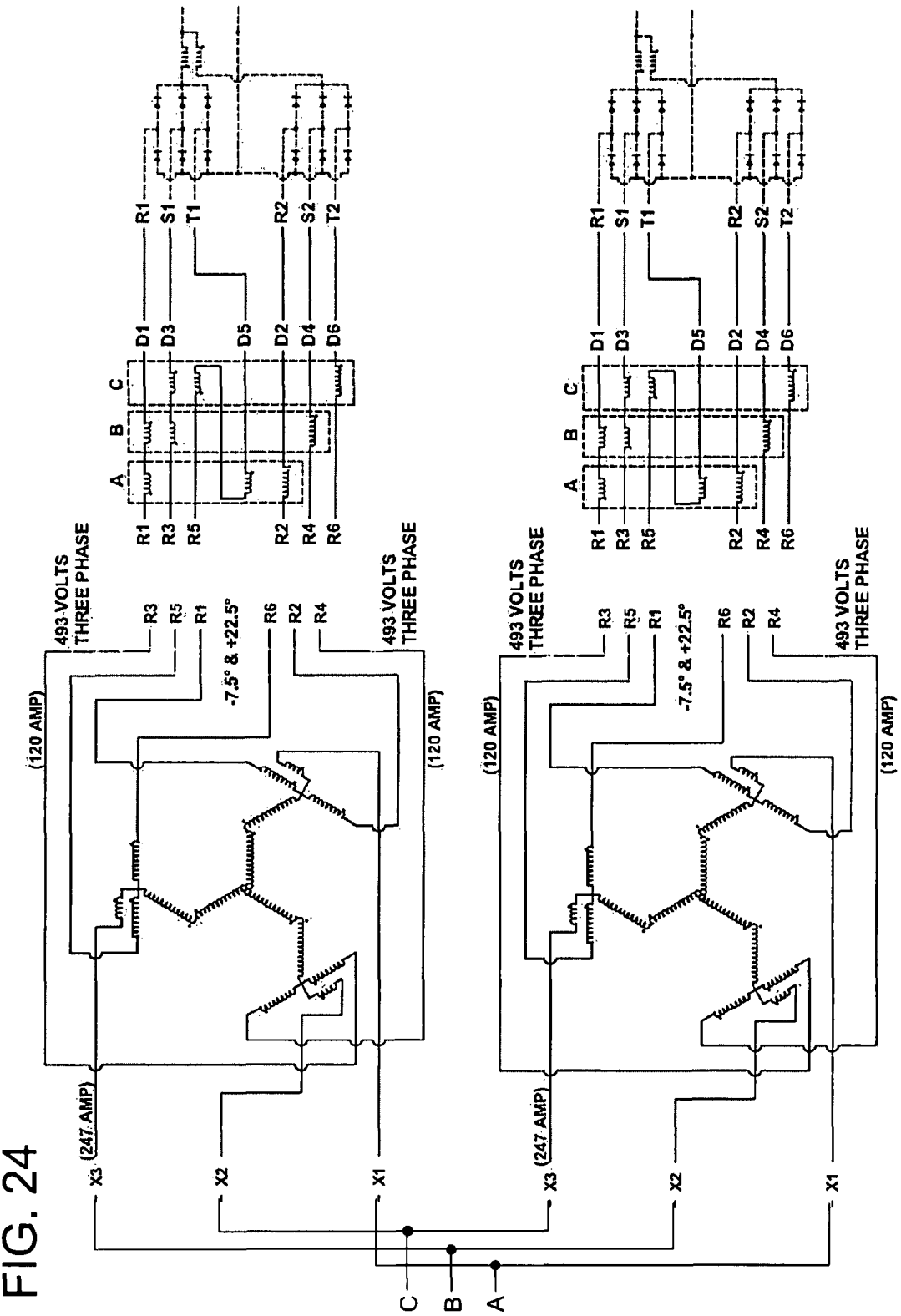
FIG. 24 illustrates an auto-transformer and input drive configuration in which the embodiment of FIG. 17 is used.
Figure 27A:
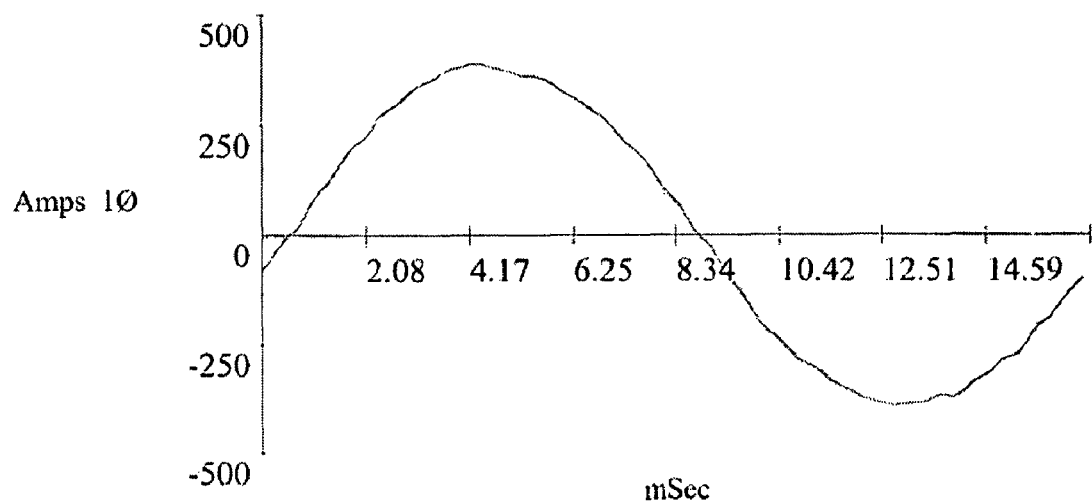
FIGS. 27a and 27b illustrate total input current and total input current harmonics data at approximately the same power level of FIGS. 26a and 26b.
Figure 27B:
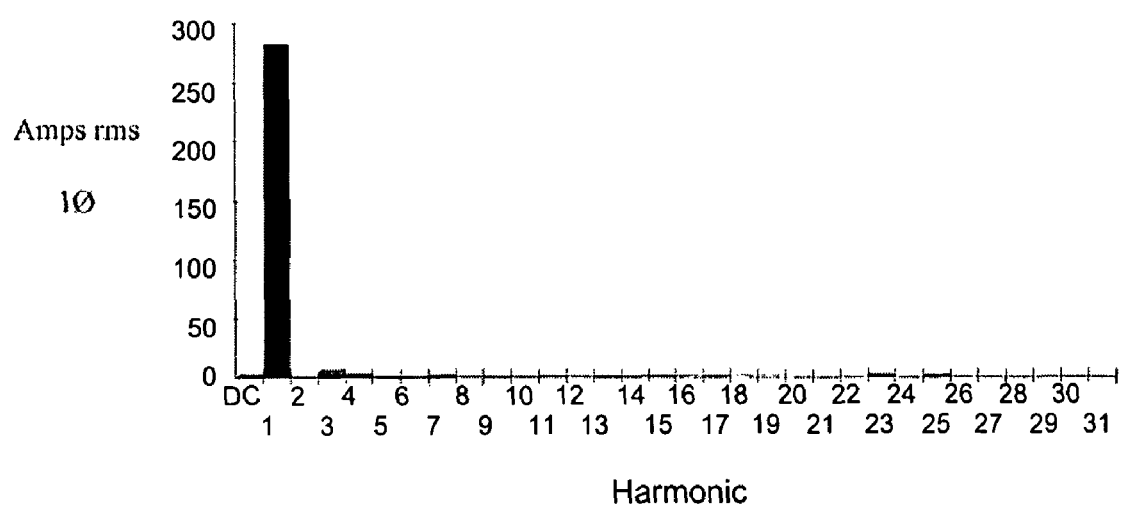

For example, using a transformer such as that described in U.S. Pat. No. 7,049,921 in a drive configuration test (see FIG. 24) using two 250 Hp motor drives, the input current harmonic for one of the drives ranged from 12.17% THD at an input current of approximately 150 amperes RMS (see FIGS. 25a and 25b) to 8.73% THD at an input current of approximately 250 amperes RMS (see FIGS. 26a and 26b) at rated power. The total input current harmonic at rated power was 1.60% THD (see FIGS. 27a and 27b). The configuration for FIGS. 27a and 27b was a pseudo 24 pulse configuration with two 12 pulse drives and the embodiment of FIG. 17. The two 12 pulse auto transformers were hooked up as shown in FIG. 24 but without the output chokes between the drive rectifiers and the auto transformers. A three phase choke on the combined input (3-5% impedance) was added.

From the foregoing, it can be seen that periodic torque disturbances can be regulated with the harmonic disturbance regulator described herein. The transformation into the harmonic reference frame allows a controller to effectively operate on dc rather than time variant signals. This isolates the controller from time variant waveforms and therefore minimizes the limitation of controller frequency response and phase shift on torque and speed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to regulate bus harmonics in a motor drive system connected to a power source, the method comprising the steps of:
    for each harmonic being regulated:
        transforming a bus feedback signal having at least one harmonic component due to the harmonic being regulated from a source reference frame to a harmonic reference frame of the harmonic being regulated to form a qd feedback signal, wherein the step of transforming the feedback signal includes the step of determining a harmonic angle of the harmonic being regulated, wherein the step of determining the harmonic angle comprises the steps of:
            resetting an output of an integrator upon detection of a zero crossing of a sine wave having the same frequency as the frequency of the power source; and
            setting the harmonic angle to the output of the integrator times the harmonic number of the harmonic being regulated;
        subtracting the qd feedback signal from a commanded value to form a qd signal;
        regulating the qd signal;
        transforming the regulated qd signal to a destination reference frame to form a compensation signal; and
        adding the compensation signal to a control signal to form a qd control signal to drive the harmonic being regulated towards the commanded value.

2. The method of claim 1 further comprising the step of filtering the qd feedback signal.

3. The method of claim 2 wherein the step of filtering the qd feedback signal comprises the step of filtering the feedback signal in the harmonic reference frame.

4. The method of claim 2 wherein the step of filtering the qd feedback signal comprises the step of filtering the qd feedback signal with a low pass filter.

5. The method of claim 1 wherein the step of adding the compensation signal to a control signal to form a qd control signal comprises the step of adding the compensation signal to a $V_{qse}$ synchronous frame voltage command in the motor drive system.

6. The method of claim 1 wherein the step of transforming the regulated qd signal to a destination reference frame comprises the step of transforming the regulated qd signal to the destination reference frame based upon a destination harmonic number.

7. The method of claim 1 wherein the step of transforming a bus feedback signal comprises the step of transforming a bus current feedback signal.

8. A computer-readable medium having computer executable instructions, that when executed, perform the steps of claim 1, including that when executed, perform the step comprising determining a harmonic angle of the harmonic being regulated, wherein the step of determining the harmonic angle comprises the steps of:
    resetting an output of an integrator upon detection of a zero crossing of a sine wave having the same frequency as the frequency of the power source; and
    setting the harmonic angle to the output of the integrator times the harmonic number of the harmonic being regulated.

9. The computer-readable medium of claim 8 having further executable instructions, that when executed, perform the step of filtering the qd feedback signal.

10. The computer-readable medium of claim 9 wherein the step of filtering the qd feedback signal comprises the step of filtering the feedback signal in the harmonic reference frame.

11. The computer-readable medium of claim 9 wherein the step of filtering the qd feedback signal comprises the step of filtering the qd feedback signal with a low pass filter.

12. The computer-readable medium of claim 8 wherein the step of adding the compensation signal to a control signal to form a qd control signal comprises the step of adding the compensation signal to a $V_{qse}$ synchronous frame voltage command in the motor drive system.

13. The computer-readable medium of claim 8 wherein the step of transforming the regulated qd signal to a destination reference frame comprises the step of transforming the regulated qd signal to the destination reference frame based upon a destination harmonic number.

14. The computer-readable medium of claim 8 wherein the step of transforming a bus feedback signal comprises the step of transforming a bus current feedback signal.

* * * * *